US012783559B2

(12) United States Patent
Sheward et al.

(10) Patent No.: US 12,783,559 B2
(45) **Date of Patent: *Nov. 3, 2026**

(54) METHOD AND APPARATUS FOR AN AI-ASSISTED VIRTUAL CONSULTANT

(71) Applicant: PwC Product Sales LLC, New York, NY (US)

(72) Inventors: Paul Sheward, Chicago, IL (US); Chung-Sheng Li, Scarsdale, NY (US); Scott Likens, Austin, TX (US); Saverio Fato, Wilton Manors, FL (US); Joseph Doyle Harrington, Granite Bay, CA (US); Joseph David Voyles, Louisville, KY (US); Jonathan B. Rhine, Suffern, NY (US); Alexander Nicholas Boldizsar, Woodstock, CT (US); Winnie Cheng, West New York, NJ (US); Todd Christopher Morrill, Newburgh, NY (US); Yuan Wan, Irvine, CA (US); William Spotswood Seward, Los Angeles, CA (US)

(73) Assignee: PwC Product Sales LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/172,308

(22) Filed: Apr. 7, 2025

(65) Prior Publication Data

US 2025/0231971 A1 Jul. 17, 2025

Related U.S. Application Data

(63) Continuation of application No. 18/336,618, filed on Jun. 16, 2023, now Pat. No. 12,282,501.

(51) Int. Cl.
*G06F 16/332* (2019.01)

(52) U.S. Cl.
CPC ................................ *G06F 16/3326* (2019.01)

(58) Field of Classification Search
CPC .................................................. G06F 16/3326
See application file for complete search history.

(56) References Cited

U.S. PATENT DOCUMENTS 5,331,554 A 7/1994 Graham
5,754,939 A 5/1998 Herz et al.
(Continued)

OTHER PUBLICATIONS

Rozen, Ohad, et al. "Answering product-questions by utilizing questions from other contextually similar products." arXiv preprint arXiv:2105.08956 (2021).*
(Continued)

*Primary Examiner* — Mohsen Almani
(74) *Attorney, Agent, or Firm* — Morrison & Foerster LLP

(57) ABSTRACT

A system for automatically generating responses to user queries includes one or more processors, operable when executing instructions to: receive a query from a user, determine a first set of similarity scores between the query and a plurality of stored queries stored in a data store, and determine whether a first similarity score of the first set of similarity scores meets a first threshold. In accordance with a determination that the first similarity score meets the first threshold, the processors are further operable to obtain a set of case information for the current case; retrieve case information for at least one precedent case; determine a second set of similarity scores between the current case and the at least one precedent case; determine whether a second similarity score of the second set of similarity scores meets a second threshold; and generate a response to the query.

19 Claims, 13 Drawing Sheets

(56) References Cited

U.S. PATENT DOCUMENTS

| | | | |
|---|---|---|---|
| 8,375,049 B2* | 2/2013 | Bailey | G06F 16/951 707/767 |
| 10,031,950 B2 | 7/2018 | Ullman et al. | |
| 10,360,265 B1 | 7/2019 | Agarwal | |
| 10,614,101 B2 | 4/2020 | Agarwal et al. | |
| 12,282,501 B2 | 4/2025 | Sheward et al. | |
| 2003/0046277 A1 | 3/2003 | Jackson et al. | |
| 2003/0144895 A1 | 7/2003 | Aksu et al. | |
| 2005/0055341 A1 | 3/2005 | Haahr et al. | |
| 2005/0118557 A1 | 6/2005 | Sumner et al. | |
| 2007/0203894 A1 | 8/2007 | Jones et al. | |
| 2010/0299342 A1 | 11/2010 | Gustafson et al. | |
| 2013/0036062 A1* | 2/2013 | Natarajan | G06Q 10/00 705/304 |
| 2013/0132203 A1 | 5/2013 | Cheng | |
| 2015/0074096 A1 | 3/2015 | Roche et al. | |
| 2015/0088733 A1 | 3/2015 | Monastyrsky et al. | |
| 2016/0110422 A1 | 4/2016 | Roytman et al. | |
| 2017/0055895 A1 | 3/2017 | Des Jardins et al. | |
| 2017/0193997 A1 | 7/2017 | Chen et al. | |
| 2018/0054464 A1 | 2/2018 | Zhang et al. | |
| 2018/0108025 A1 | 4/2018 | Agarwal et al. | |
| 2018/0357286 A1 | 12/2018 | Wang et al. | |
| 2019/0163805 A1 | 5/2019 | Agarwal et al. | |
| 2019/0220695 A1 | 7/2019 | Nefedov | |
| 2020/0034357 A1 | 1/2020 | Panuganty | |
| 2020/0202194 A1 | 6/2020 | Wu et al. | |
| 2021/0014354 A1 | 1/2021 | Ly et al. | |
| 2021/0042800 A1 | 2/2021 | Chandra et al. | |
| 2021/0406735 A1 | 12/2021 | Nahamoo et al. | |
| 2022/0357177 A1* | 11/2022 | Skupin | G06F 16/38 |
| 2023/0353516 A1 | 11/2023 | Banerjee et al. | |
| 2024/0168982 A1* | 5/2024 | Patnaik | G06F 21/6227 |
| 2024/0338393 A1 | 10/2024 | Malon et al. | |
| 2024/0378389 A1 | 11/2024 | Rose et al. | |
| 2025/0028742 A1 | 1/2025 | Sheward et al. | |

OTHER PUBLICATIONS

Kassner N, Tafjord O, Sabharwal A, Richardson K, Schuetze H, Clark P. Language models with rationality. arXiv preprint arXiv: 2305.14250. May 23, 2023.*

Francesconi E, Borges G, Sorge C, editors. Legal Knowledge and Information Systems: JURIX 2022: the Thirty-Fifth Annual Conference, Saarbrücken, Germany, Dec. 14-16, 2022. IOS Press; Dec. 15, 2022.*

Lin Z, Trivedi S, Sun J. Generating with confidence: Uncertainty quantification for black-box large language models. arXiv preprint arXiv:2305.19187. May 30, 2023.*

International Search Report and Written Opinion mailed Nov. 6, 2023, directed to International Application No. PCT/US2023/070333; 11 pages.

Sheward et al., U.S. Office Action dated May 13, 2025, directed to U.S. Appl. No. 18/353,449; 42 pages.

Al-Kofahi et al. (2001) "A machine learning approach to prior case retrieval," Proceedings of the 8th International Conference on Artificial Intelligence and Law; pp. 88-93.

International Search Report and Written Opinion mailed Oct. 6, 2023, directed to International Application No. PCT/US2023/068607; 11 pages.

Lu, et al. (2012) "Bringing order to legal documents—an issue-based recommendation system via cluster association," in Proceedings of the International Conference on Knowledge Engineering and Ontology Development, vol. 2, SciTePress; pp. 76-88.

Westermann, et al. "Paragraph similarity scoring and fine-tuned BERT for legal information retrieval and entailment," New Frontiers in Artificial Intelligence: JSAI-isAI 2020 Workshops, JURISIN, LENLS 2020 Workshops, Virtual Event, Nov. 15-17, 2020; 17 pages.

Sheward et al., U.S. Office Action dated Oct. 29, 2025, directed to U.S. Appl. No. 18/353,449; 45 pages.

Tian et al. (Oct. 2023). "Just Ask for Calibration: Strategies for Eliciting Calibrated Confidence Scores from Language Models Fine-Tuned with Human Feedback," arXiv:2305.14975v2; 10 pages.

* cited by examiner

900

METHOD AND APPARATUS FOR AN AI-ASSISTED VIRTUAL CONSULTANT

CROSS-REFERENCE TO RELATED APPLICATIONS

This application is a continuation of U.S. application Ser. No. 18/336,618, filed Jun. 16, 2023, the entire contents of which is incorporated herein by reference.

FIELD

The present disclosure is generally related to artificial-intelligence-assisted consultation, and more specifically to artificial-intelligence-assisted consultation leveraging precedent-case data.

BACKGROUND

User queries in various fields may be complex, time-sensitive, and may often require consulting with human experts. However, access to human experts may be limited, so such human-centered consulting may be difficult to scale and sustain for large entities. Searching for information responsive to a specific query may also be inefficient as complex searches can result in a lot of information, which takes time to sift through and find the most relevant parts for a specific query. Automatic response generators that substitute for various parts of human-centered responses may also be trained on or otherwise rely on massive stores of information and may also be inefficient in providing relevant responses to user queries.

SUMMARY

The present disclosure introduces an artificial-intelligence-based virtual consultant application that may automatically generate responses to various user queries that incorporate contextual information about both the user and the topic of the user's query. The consultant application may be an artificial-intelligence-based system that receives a query from a user, where the user's query may be associated with a particular case that the user is currently working on. The consultant application may then compare the user's query to stored queries to determine if the user's query is similar to any previously known queries. If the user's query is similar to a stored query, the consultant application may compare the current case against precedent cases that are associated with the similar stored query. The consultant application may then generate a response to the user's query based on any precedent cases that are determined to be similar to the current case associated with the user's query.

In various embodiments, a system for automatically generating responses to user queries includes one or more processors, and a memory coupled to the one or more processors comprising instructions executable by the one or more processors. The processors are operable when executing the instructions to receive a query from a user, wherein the query is associated with a current case; determine a first set of similarity scores between the query and a plurality of stored queries stored in a data store, wherein each of the plurality of stored queries is associated with one or more supplemental queries, and wherein each of the plurality of stored queries is associated with one or more precedent cases; and determine whether a first similarity score of the first set of similarity scores meets a first threshold, wherein the first similarity score is associated with a first stored query of the plurality of stored queries. The processors are further operable when executing the instructions to, in accordance with a determination that the first similarity score meets the first threshold, obtain a set of case information for the current case, wherein the set of case information is responsive to one or more supplemental queries of the first stored query; retrieve, from the data store, at least one set of case information for at least one precedent case associated with the first stored query; determine a second set of similarity scores between the current case and the at least one precedent case based on the set of case information for the current case and the at least one set of case information for the at least one precedent case; determine whether a second similarity score of the second set of similarity scores meets a second threshold; and upon determining that the second similarity score meets the second threshold, generate a response to the query based on one of the at least one precedent case corresponding to the second similarity score.

Optionally, the processors are further operable when executing the instructions to determine whether each of the second set of similarity scores is below the second threshold; and upon determining that each of the second set of similarity scores is below the second threshold, generate a second response to the query based on a weighted average of the at least one set of case information for the at least one precedent case, wherein a plurality of weights for the weighted average is based on the second set of similarity scores.

Optionally, the response is generated based on output from an artificial intelligence model that is trained on the at least one set of case information for the at least one precedent case.

Optionally, the processors are further operable when executing the instructions to determine whether each of the first set of similarity scores is below the first threshold, and in accordance with a second determination that each of the first set of similarity scores is below the first threshold: identify one or more sub-queries associated with the query; determine whether a third similarity score of a third set of similarity scores between at least one of the one or more sub-queries and at least one of the plurality of stored queries meets the first threshold; and in accordance with a third determination that the third similarity score meets the first threshold, generate the response to the query based on a precedent case associated with one of the plurality of stored queries corresponding to the third similarity score.

Optionally, the processors are further operable when executing the instructions to determine whether each of the third set of similarity scores is below the first threshold, and in accordance with a fourth determination that each of the third set of similarity scores is below the first threshold: provide a prompt to the user; receive an input from the user responsive to the prompt, wherein the input comprises a revision to the query or to one of the one or more sub-queries; and generate the response to the query based on the input from the user.

Optionally, the processors are further operable when executing the instructions to determine whether each of the third set of similarity scores is below the first threshold, and in accordance with a fourth determination that each of the third set of similarity scores is below the first threshold: identify a set of further sub-queries, wherein each of the further sub-queries of the set of further sub-queries is associated with one of the one or more sub-queries; and generate the response to the query based on whether a fourth set of similarity scores between the set of further sub-queries and the plurality of stored queries meets the first threshold.

Optionally, the processors are further operable when executing the instructions to determine whether each of the third set of similarity scores is below the first threshold, and in accordance with a fourth determination that each of the third set of similarity scores is below the first threshold: instantiate a communication link between a first device of the user and a second device of a subject matter expert, wherein the subject matter expert generates the response to the query.

Optionally, the processors are further operable when executing the instructions to forward engagement information associated with the user to the subject matter expert.

Optionally, obtaining the set of case information for the current case includes providing, to the user, the one or more supplemental queries associated with the stored query, and receiving, from the user in response to the one or more supplemental queries, the set of case information for the current case.

Optionally, at least one later supplemental query of the one or more supplemental queries provided to the user changes based on a user response to an earlier supplemental query of the one or more supplemental queries provided to the user.

Optionally, obtaining the set of case information for the current case comprises automatically retrieving data on the user or the current case from the data store.

Optionally, the response comprises a confidence score on an accuracy of the response with respect to the query.

Optionally, the processors are further operable when executing the instructions to determine whether the confidence score is below a predetermined confidence threshold, wherein, in accordance with determining that the confidence score is below the predetermined confidence threshold, the response includes a recommendation for the user to consult with a subject matter expert.

Optionally, the response comprises a rationale for the response.

Optionally, the second set of similarity scores is determined based on a number of differences between the set of case information for the current case and the at least one set of case information for the at least one precedent case.

Optionally, the processors are further operable when executing the instructions to receive feedback from the user about the response to the query, and update, based on the feedback, a first algorithm for determining the first set of similarity scores or a second algorithm for determining the second set of similarity scores.

Optionally, the processors are further operable when executing the instructions to: prior to generating the response to the user, receive, from the user, a preliminary response to the query, and wherein the generated response comprises an agreement or disagreement on an accuracy of the preliminary response and a rationale for the agreement or disagreement.

Optionally, the response comprises a reference to the one of the at least one precedent case.

In various embodiments, a method, performed by a system comprising one or more processors, for automatically generating responses to user queries includes receiving a query from a user, wherein the query is associated with a current case; determining a first set of similarity scores between the query and a plurality of stored queries stored in a data store, wherein each of the plurality of stored queries is associated with one or more supplemental queries, and wherein each of the plurality of stored queries is associated with one or more precedent cases; and determining that a first similarity score of the first set of similarity scores meets a first threshold. The method further includes, in accordance with the determination that the first similarity score meets the first threshold: obtaining a set of case information for the current case, wherein the set of case information is responsive to the one or more supplemental queries of the stored query; retrieving, from the data store, at least one set of case information for at least one precedent case associated with the stored query; determining a second set of similarity scores between the current case and the at least one precedent case based on the set of case information for the current case and the at least one set of case information for the at least one precedent case; determining that a second similarity score of the second set of similarity scores meets a second threshold; and upon determining that the second similarity score meets the second threshold, generating a response to the query based on one of the at least one precedent case corresponding to the second similarity score.

In various embodiments, a non-transitory computer-readable storage medium stores instructions for automatically generating responses to user queries, the instructions operable when executed by one or more processors of a system to cause the system to receive a query from a user, wherein the query is associated with a current case; determine a first set of similarity scores between the query and a plurality of stored queries stored in a data store, wherein each of the plurality of stored queries is associated with one or more supplemental queries, and wherein each of the plurality of stored queries is associated with one or more precedent cases; and determine whether a first similarity score of the first set of similarity scores meets a first threshold. The instructions are further operable when executed to cause the system to, in accordance with a determination that the first similarity score meets the first threshold: obtain a set of case information for the current case, wherein the set of case information is responsive to the one or more supplemental queries of the stored query; retrieve, from the data store, at least one set of case information for at least one precedent case associated with the stored query; determine a second set of similarity scores between the current case and the at least one precedent case based on the set of case information for the current case and the at least one set of case information for the at least one precedent case; determine whether a second similarity score of the second set of similarity scores meets a second threshold; and upon determining that the second similarity score meets the second threshold, generate a response to the query based on one of the at least one precedent case corresponding to the second similarity score.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION

The present disclosure introduces an artificial-intelligence-based virtual consultant application. The consultant application may be trained to automatically generate responses to user queries that incorporate contextual information about both the user and the topic of the user's query. The consultant application may base its response on an efficient search of existing and relevant information. The consultant application may begin by receiving a query from a user, where the user's query may be associated with a particular case that the user is currently working on. The consultant application may then compare the user's query to stored queries to determine if the user's query is similar to any previously known queries. If the user's query is similar to a stored query, the consultant application may compare the current case against precedent cases that are associated with the similar stored query. The consultant application may then generate a response to the user's query based on any precedent cases that are determined to be similar to the current case associated with the user's query. In the case where there are no precedent cases that are similar to the current case, the consultant application may generate a response based on a combination of various precedent cases. On the other hand, if there are no stored queries that are similar to the user's query, the consultant application may decompose the user's query into sub-queries that may be similar to stored queries. In this way, the consultant application may also improve the efficiency of search for relevant information by limiting the search to existing queries similar to the user's initial query as well as limiting the search to precedent cases that are more likely to be similar to the current case that a user is working on.

In the following description of the various examples, reference is made to the accompanying drawings, in which are shown, by way of illustration, specific examples that can be practiced. The description is presented to enable one of ordinary skill in the art to make and use the invention and is provided in the context of a patent application and its requirements. Various modifications to the described examples will be readily apparent to those persons skilled in the art and the generic principles herein may be applied to other examples. Thus, the present invention is not intended to be limited to the examples shown but is to be accorded the widest scope consistent with the principles and features described herein.

Figure 1:
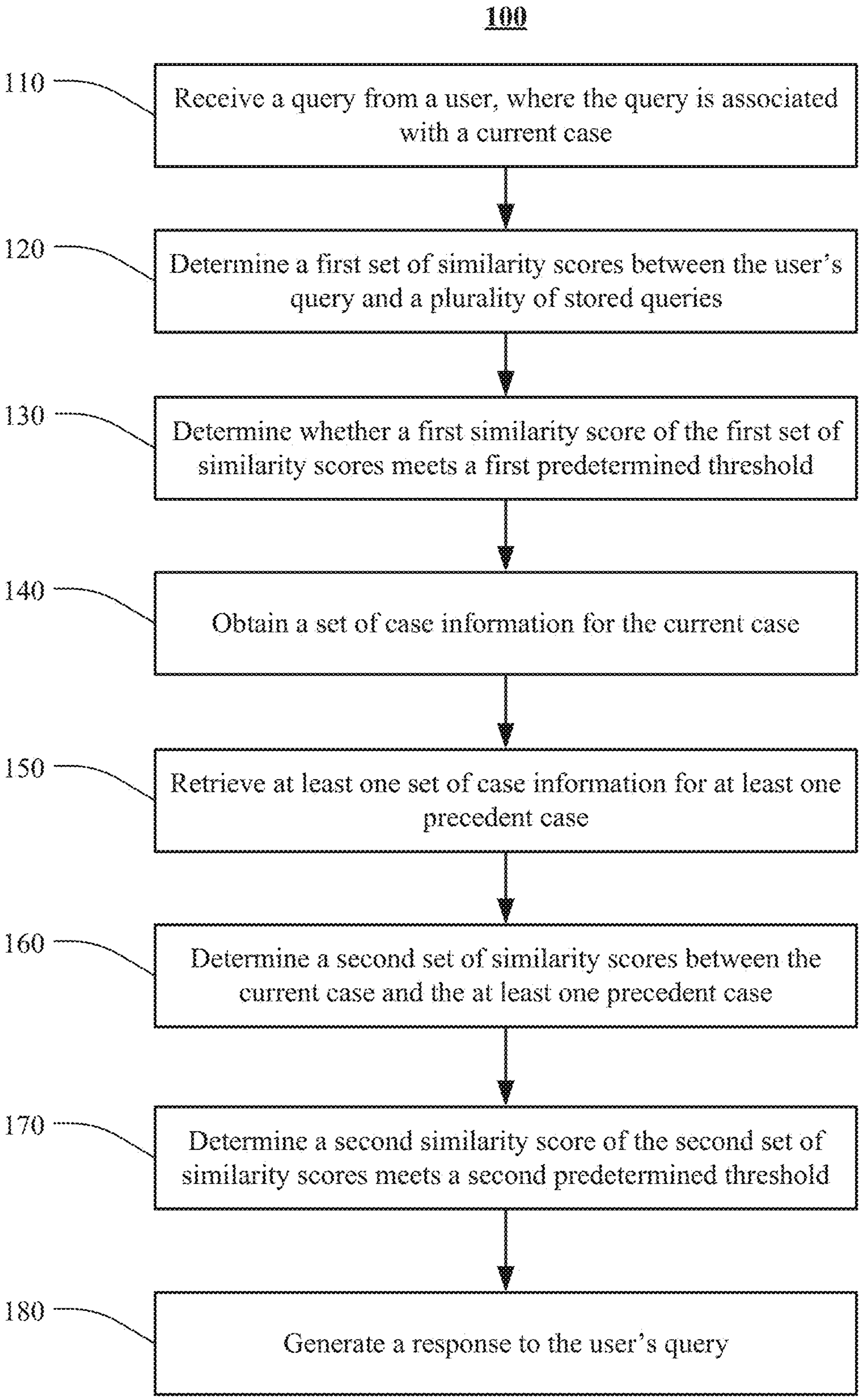
FIG. 1 illustrates a method for automatically generating responses to user queries.

FIG. 1 illustrates a method 100 for automatically generating responses to user queries. The method 100 may be executed by an application on any computing device, where the application may operate as an artificial-intelligence-based consultant for the user that automatically provides guidance on various questions that the user may have, and may also be referenced herein as the consultant application. The method 100 may begin at step 110 where the consultant application may receive a query from a user. The query received from the user may also be referenced herein as the user's query. In various embodiments, the query may include a question the user has about a particular topic. The query may be associated with a current case that the user is working on. As referenced herein, a case may be an instance of a problem in a particular field, such as a financial case, legal case, or a technology case, among many others. The current case may be the case associated with the query that the user provided and may be the case that the user is currently working on, although the current case may only be one case among many other past or concurrent cases which the user may or may not be associated with.

In various embodiments, the consultant application may receive additional input from the user for identifying the current case. For example, the consultant application may receive a reference to the current case which may be in various formats, such as an active link to the current case or a specific case identifier (such as an alphanumeric label) that may be used to search for the corresponding case in a data store. The additional input for identifying the current case may be received together with the user's query, or it may be received at a later time, and may be as a result of additional prompts directed to the user for such information, as described further herein. The consultant application may also identify the current case by analyzing the content of the user's query, or automatically retrieve various information related to the user, such as personal data, workflow history, or other metadata, which is also described further herein.

After receiving the query from the user, the method 100 may proceed to step 120 where the consultant application may determine a first set of similarity scores between the user's query and a plurality of queries stored in a data store, such as a database. The queries stored in the data store may also be referenced herein as stored queries. The stored queries may be queries that the consultant application has previously received from other users, or they may be queries that subject matter experts (SMEs) pre-populated into the data store. The stored queries may help the consultant application to generate a response to the new user's query that was received at step 110, with the relevant stored query being determined based on the first set of similarity scores. To that end, each of the stored queries may be associated with one or more precedent cases that may be related to that stored query. As referenced herein, a precedent case may be any previous case relative to the current case or any concurrent case relative to the current case. The precedent cases may be directed to any number of topics, both overall and among those associated with any stored query. The precedent cases may also be stored in the data store along with the stored queries, or they may be stored separately.

The precedent cases associated with a stored query may be predetermined by SMEs based on the topic of the stored query and the topics of the precedent cases. That is, precedent cases that share a topic with a stored query may be associated with that stored query. For example, a first stored query with a topic directed to determining the accounting acquirer in a business transaction may be associated with precedent cases directed to determining accounting acquirers, while another stored query with a topic directed to determining the principal vs. agent in a transaction may be associated with a different set of precedent cases directed to determining the principal vs. agent. Any particular precedent case may also be associated with more than one stored query if the particular precedent case relates to multiple topics.

In addition to the precedent cases, each of the stored queries may also be associated with one or more supplemental queries. The supplemental queries associated with a given stored query may be questions that help extract case information about a case to compare against the precedent cases associated with the given stored query. In various embodiments, only a subset of the stored queries may be associated with supplemental queries, and the stored queries not associated with any supplemental queries may be associated directly with a response, one or more precedent cases, or a combination thereof.

The first set of similarity scores between the user's query and the stored queries may be based on the similarity between the user's query and each of the stored queries. Similarity between queries may be determined in various ways in various embodiments. For example, similarity may be based on the topic of the user's query and a stored query, or it may be based on semantic similarity. The application may determine the topic of the user's query to a predetermined granularity (e.g., is the topic of the query related to finance, law, technology, etc., or is the topic of the query related to a specific area of finance, such as tax, trust, audit, etc.), and then among the stored queries that share a common topic with the user's query, determine a semantic similarity between those stored queries and the user's query.

Various implementations may be appropriate for determining similarity between queries in various embodiments. For example, a text encoder (e.g., SentenceTransformer) may create a text embedding for the user's query that is compared against the text embeddings associated with the stored queries. Cosine similarity may then be computed between the user's query's text embedding and the text embeddings of the stored queries, where the speed of the computation may be increased using various approaches (e.g., FAISS). In this case, the cosine similarity between the text embedding of the user's query and the text embedding of each of the stored queries may correspond to the first set of similarity scores.

At step 130, the consultant application may determine whether a first similarity score from the first set of similarity scores meets a first threshold. The first similarity score may be associated with a particular stored query and may indicate the similarity between that particular stored query and the user's query. The first threshold may be a query similarity threshold. That is, the first threshold may identify how high the similarity score between the user's query and a stored query should be for the queries to be considered similar to each other. Each of the similarity scores in the first set of similarity scores may be compared to the first threshold, and the score that meets the threshold may be selected, along with the corresponding stored query. As such, the stored query that corresponds to the similarity score which meets the first threshold may be the stored query that is determined to be similar to the user's query. The specific implementation for the first threshold may also correspond to the implementation of the similarity score. Using the above example, with the similarity score being implemented as a cosine similarity, the first threshold may be implemented as a threshold cosine similarity. Additionally, the thresholds referenced herein, which may include the first threshold as described, may be determined in various manners, such as based on the state of various system settings, based on manual input from a system administrator, or automatically determined by the consultant application based on analyzing various data, such as data related to the user, the current case, an organization's guidelines, among many others.

This application describes the use of thresholds to determine whether to take certain actions, for example on the basis of whether a score (such as a similarity score between a stored query and the user's query) does or does not meet a threshold. A person of skill in the art would understand that, in a same or similar manner as determining whether a score meets a threshold as a condition for taking an action, the system may apply one or more additional or alternative conditions for taking an action. That is, the system may determine whether a predefined (and/or dynamically determined) set of one or more conditions is met, wherein the set of one or more conditions may or may not include a condition that a score meets a threshold.

Additionally, depending on the user's query and the stored query, it may be the case that the similarity score between the user's query and only one stored query meets the first threshold, but it may also be the case that the similarity scores between the user's query and multiple stored queries meet the first threshold. As such, in various embodiments, there may be one or more stored queries that are determined to be similar to the user's query. In various other embodiments, it may also be the case that multiple user queries are determined to be similar to a particular stored query. The particular stored query may be directed to a common topic, and the multiple user queries may all be directed to that common topic and thus determined to be similar to the particular stored query. Since multiple user queries may all be similar to any particular stored query, the stored queries may also be considered "query buckets" that group similar user queries together.

At step 140, the consultant application may obtain a set of case information for the current case. The case information may include various additional details about the current case that may subsequently be used to compare the current case against precedent cases to help generate a response to the user's query. The comparison between the current case's case information and that of precedent cases may help determine if a precedent case is relevant in generating the response to the user query. The supplemental queries associated with the stored query identified in step 130 may indicate the relevant additional information about the current case that the consultant application should obtain, which may subsequently be compared against that of a precedent case. That is, the consultant application may obtain case information that is responsive to the supplemental queries as that information may be what is relevant in determining which precedent cases to use in generating a response to the user's query. Various embodiments may utilize the supplemental queries in various ways to obtain the case information, such as providing the supplemental queries to the user and prompting the user for responses to the supplemental queries, or automatically retrieving information that is responsive to the queries. In various embodiments where a subset of the stored queries may not be associated with any supplemental queries, the consultant application may provide a response once a stored query is determined to be similar to the user's query, which may mean skipping from step 130 to step 180.

At step 150, the consultant application may retrieve at least one set of case information for at least one of the precedent cases associated with the stored query identified as a result of step 130. Since there may be more than one precedent case associated with the stored query, the case information for multiple precedent cases may be retrieved during this step. The precedent cases' case information may include the various details about the precedent cases, as well as the ultimate resolution for a precedent case. This means the specific case data that is retrieved may vary depending on the topic of the precedent case and the specific precedent case itself. For example, in the case where the topic is directed to determining the accounting acquirer, the case information retrieved may include the revenue for the involved parties over the last 12 months or the total assets for the involved parties. The case information may also include which of the involved parties was ultimately determined to be the accounting acquirer.

At step 160, the consultant application may determine a second set of similarity scores between the current case and the precedent cases retrieved at step 150. Whereas the first set of similarity scores determined at step 120 may be based on how similar the user's query is to the stored queries, the second set of similarity scores may be based on how similar the current case is to the precedent cases associated with a stored query that is similar to the user's query. Similarity between cases may be determined in various ways in various embodiments. For example, similarity may be based on the number of similarities or differences between the respective case information of the current and precedent cases, where the current case and a precedent case may be determined to be more similar to one another if the case information between the cases have more overlapping details. The overlap between the case information may be based on various aspects, such as what parties are involved in both cases, what similarities do the involved parties share if there are different parties involved, what events have happened, what actions were undertaken by the involved parties, what laws are involved, among many others. The similarity score between the current case and any given precedent case may then be based on the amount of overlap between the cases' case information.

At step 170, the consultant application may determine that a second similarity score from the second set of similarity scores meets a second threshold. The second threshold may be a case similarity threshold. Whereas the first threshold may indicate the similarity score threshold that the user's query and a stored query should meet for the queries to be considered similar to each other, the second threshold may indicate how high the similarity score between the current case and a precedent case should be for the cases to be considered similar. Each of the similarity scores in the second set of similarity scores may be compared against the second threshold, and any score (along with the corresponding precedent case) that meets the threshold may be selected. The second threshold in various embodiments may be a specific number of case details that should be present in both the current case and a particular precedent case for the cases to be considered similar.

At step 180, the consultant application may generate a response to the user's query. The response may be based on the precedent cases that are determined to be similar to the current case as a result of step 170. The response may be based on a single precedent case or multiple precedent cases. For example, the response may be based on the single precedent case corresponding to the highest similarity score from the second set of similarity scores. This may mean that the response is based on the most similar precedent case to the current case, even if there were multiple precedent cases that met the second threshold. The response may also be based on a single precedent case if only a single similarity score of the second set of similarity scores met the second threshold, which may mean there was only one precedent case that was determined to be similar to the current case. In various embodiments where multiple precedent cases are similar to the current case, the response may also be based on some combination of all the similar precedent cases. The case information from the similar precedent cases may be combined in various manners, such as taking an average of different details in the precedent cases' case information. The average may also be a weighted average of the precedent cases' case information. Additionally, the weights for the precedent cases in the weighted average may be based on the precedent cases' corresponding similarity scores in the second set of similarity scores. That is, the case information for the precedent cases corresponding to a higher similarity score may be given a greater weight in the weighted average, which may mean precedent cases that are more similar to the current case have more weight in the average that is used to generate the response. The generated response may also include a reference to any precedent cases that the response was based on, where the reference may be a link to the storage locations of the precedent cases.

The response to the user's query may also be generated in various ways. For example, there may be a number of preconfigured template responses associated with various keywords that may appear in any combination of the user's query, stored queries similar to the user's query, or the case information of the current case and similar precedent cases. The template responses may then be populated based on the substance or other keywords in the user's query, similar stored queries, and/or the current case and similar precedent cases. Alternatively, the response may be custom generated using various text generation or natural language processing techniques that may base the response on an understanding of the substance of the user's query, similar stored queries, the current case, and similar precedent cases. In various embodiments, the response may also include text and images.

In various embodiments, the consultant application may include an artificial intelligence (AI) model that is trained to execute one or more steps of method 100. For example, in the case of determining the accounting acquirer, an AI model may be trained based on the case information for the precedent cases in the data store that are related to determining the accounting acquirer. The trained AI model may then receive case information for the current case and output a prediction for the accounting acquirer for the current case based on that information. In processing the current case's case information using its trained parameters, the AI model may determine the similarity of various aspects of the current case to the precedent cases the model was trained on, and based on whether those similarities meet similarity thresholds as dictated by its trained parameters, generate an output for whether the current case is similar to any of the precedent cases.

The output of the AI model may provide various information depending on the model architecture used for the AI model. For example, the AI model may be implemented as a binary logistic regression classifier, where the binary output indicates which of the two companies (Company A and Company B) in a business transaction should be the accounting acquirer. The output of the model may be a probability for the positive label/class, or the probability that one of the companies (say Company A) in the business transaction should be the accounting acquirer, but the probability may also be considered the consultant application's confidence score that the particular company should be the accounting acquirer (i.e., the confidence of the consultant application that Company A should be the accounting acquirer). In this case, both the predicted accounting acquirer and the confidence score outputted by the AI model may be included in the response to the user's query. It may also be noted that the AI model may include one or more models that are each trained at various granularities. For example, various embodiments of the AI model may be a single AI model that is trained on all the precedent cases to generate an output for any information about a current case. The AI model in various other embodiments may include multiple models, where each model is trained on a subset or all of the precedent cases to generate an output for a particular topic (such as determining an accounting acquirer), or to generate an output for a particular stored query. The response to the user's query may then be generated based on the AI model's output, or the AI model's output may be the response itself.

After the response is generated and provided to the user, the user may submit feedback about the generated response. The user's feedback may include feedback on various aspects of the response with respect to the user's query, such as the accuracy of the response, the relevance of the response in general and/or the relevance of specific details in the response, whether there was enough detail provided as part of the response, among many others. The user's feedback may be provided directly to the consultant application through the same means that the response was initially provided to the user, such as a user interface, or the user's feedback may be submitted to a separate system associated with the consultant application. The consultant application may use the user's feedback to identify various aspects of the generated response that may have been sufficient or insufficient, which may help improve subsequent responses to other users' queries. For example, the feedback may be used to update the consultant application to improve the accuracy of comparisons in future instances, such as to fine-tune the AI model, or to update one or more algorithms used to determine the similarity scores between queries or the similarity scores between cases.

Figure 2:
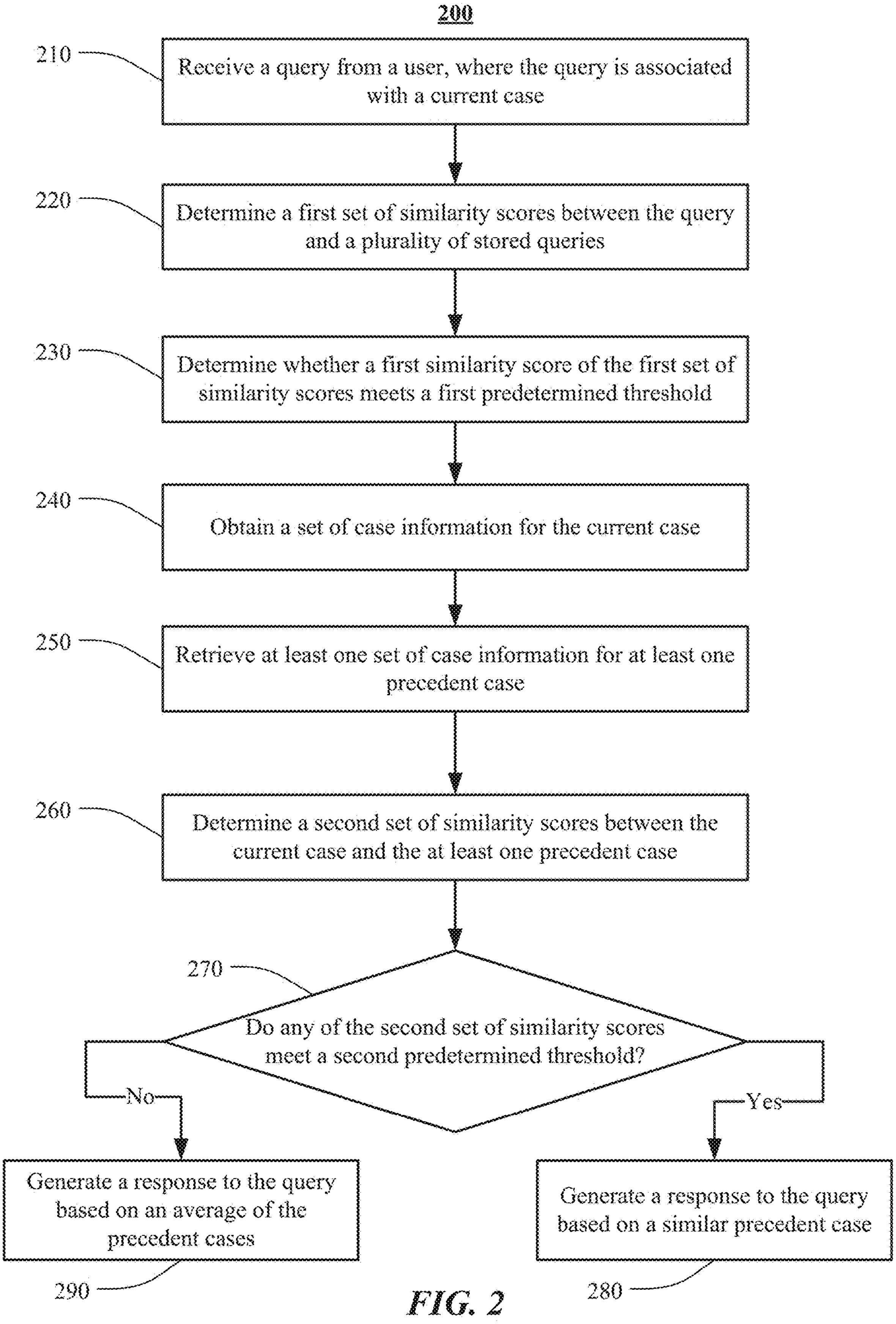
FIG. 2 illustrates a method for automatically generating responses to user queries that is conditional on the similarity of precedent cases to the current case.

FIG. 2 illustrates a method 200 for automatically generating responses to user queries that is conditional on the similarity of precedent cases to the current case. The steps of method 200 may largely correspond to the steps of method 100, with the main difference being how the response to the user query is ultimately generated based on whether any precedent cases are determined to be similar to the current case. And like method 100, method 200 may also be executed by an application on any computing device, where the application may operate as a consultant for the user that automatically provides guidance on various questions that the user may have, and may be referenced herein as a consultant application. The method 200 may begin at step 210 where the consultant application may receive a query from a user, where the query is associated with a current case that the user is working on. The query may include a question the user has about a particular topic. In various embodiments, step 210 may correspond to step 110 of method 100.

At step 220, the consultant application may determine a first set of similarity scores between the user's query a plurality of queries stored in a data store. Each of the stored queries may be associated with one or more precedent cases, and may also be associated with one or more supplemental queries. In various embodiments, each of the stored queries may be associated with supplemental queries, but in various other embodiments, only a subset of the stored queries may be associated with supplemental queries. Additionally, the first set of similarity scores may be based on a similarity between the user's query and each of the stored queries. In various embodiments, step 220 may correspond to step 120 of method 100.

At step 230, the consultant application may determine whether a first similarity score from the first set of similarity scores meets a first threshold. Like in method 100, the first threshold may be a query similarity threshold, and may identify how high the similarity score between the user query and a stored query should be for the queries to be considered similar to each other. Each of the similarity scores in the second set of similarity scores may be compared against the second threshold, and any score that meets the threshold may be selected, with the corresponding stored queries determined to be similar to the user's query. The subsequent disclosure may be discussed from the perspective of one stored query being similar to the user's query, but it may be understood that various steps may apply similarly if multiple stored queries are determined to be similar to the user's query. In various embodiments, step 230 may correspond to step 130 of method 100.

At step 240, the consultant application may obtain a set of case information for the current case, which may include additional details about the current case to compare against that of precedent cases to generate a response. The case information that is obtained may be responsive to the supplemental queries associated with the stored query identified from step 230. The supplemental queries may be utilized in various ways to obtain the case information about the current case, such as being provided to the user to prompt the user for responses to the supplemental queries, or automatically retrieving information about the current case that is responsive to the supplemental queries. In various embodiments, step 240 may correspond to step 140 of method 100.

At step 250, the consultant application may retrieve at least one set of case information for at least one of the precedent cases associated with the stored query that is determined to be similar to the user's query as a result of step 230. The case information for more than one precedent case may be retrieved as there may be more than one precedent case associated with the stored query. In various embodiments, step 250 may correspond to step 150 of method 100.

At step 260, the consultant application may determine a second set of similarity scores between the current case and the precedent cases associated with the stored query that is similar to the user's query. Similar to in method 100, the second set of similarity scores may be based on the similarity between the case information of the current case and the case information of precedent cases. That is, the case information for the current case may be compared with each set of case information for the precedent cases associated with the stored query that is similar to the user's query to determine the second set of similarity scores. In various embodiments, step 260 may correspond to step 160 of method 100.

At step 270, the consultant application may determine if any of the similarity scores in the second set of similarity scores meet a second threshold. The second threshold may be a case similarity threshold which indicates the threshold that the similarity score for the current case and a precedent case should meet for the current case and the precedent case to be considered similar. Step 270 may be similar to step 170 of method 100 in that both steps may include the consultant application comparing the similarity scores in the second set of similarity scores to a second threshold. However, step 270 may differ from step 170 of method 100 in that the consultant application in step 270 may not assume that at least one of the similarity scores will meet the second threshold, and may include consideration for the case where none of the similarity scores meet the second threshold.

If the consultant application makes a determination at step 270 that at least one of the similarity scores from the second set of similarity scores meets the second threshold, the method 200 may proceed from step 270 to step 280 where the consultant application may generate a response to the query from the user based on the precedent cases that are determined to be similar to the current case. At least one of the similarity scores meeting the second threshold may mean that at least one precedent case is similar to the current case. The information for the precedent case or cases that are similar to the current case may be used to generate a response to the user's query, and may be used in a similar manner as that described for step 180 of method 100 above. In various embodiments, step 280 may correspond to step 180 of method 100.

If the consultant application makes a determination at step 270 that none of the similarity scores from the second set of similarity scores meets the second threshold, the method 200 may proceed from step 270 to step 290. Since none of the similarity scores in the second set of similarity scores met the second threshold, this may mean none of the precedent cases is similar to the current case. This result may indicate that the user's query was determined to be similar to a stored query (as a result of step 230), yet none of the precedent cases associated with the stored query is similar to the current case. As a result, the response to the user's query may instead be generated based on all the precedent cases associated with the similar stored query. The manner that the response is generated at this step may be similar to how a response is generated based on multiple precedent cases as described above in step 180 of method 100. Specifically, the response may be based on a combination of all the precedent cases, such as by taking an average of different details in the precedent cases' case information.

Figure 3:
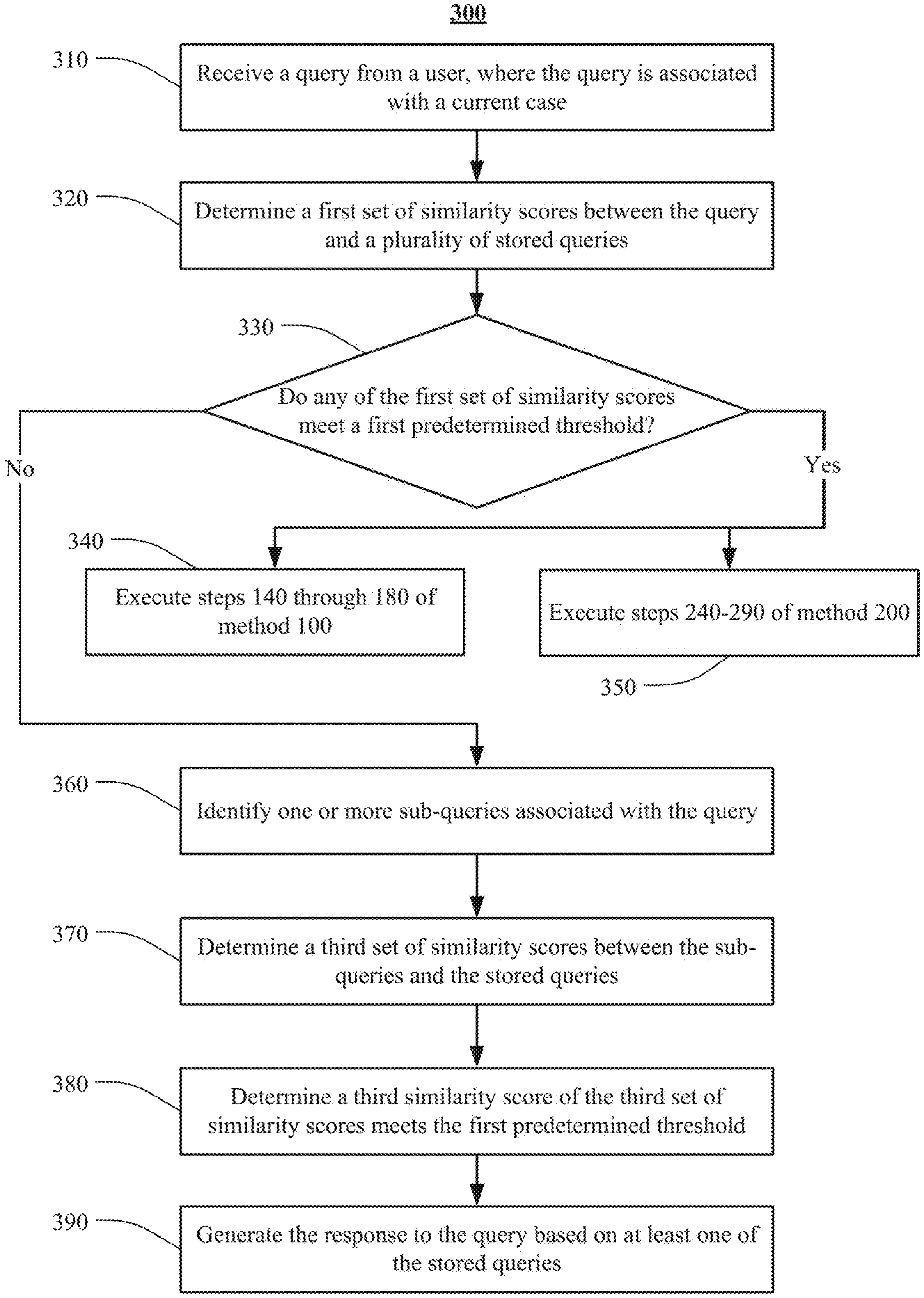
FIG. 3 illustrates a method for automatically generating responses to user queries that includes branching steps conditional on the similarity of a user's query to stored queries.

FIG. 3 illustrates a method 300 for automatically generating responses to user queries that includes branching steps conditional on the similarity of a user's query to stored queries. Method 300 may also be executed by an application on any computing device, where the application may operate as a consultant for the user that automatically provides guidance on various questions that the user may have, and may be referenced herein as a consultant application. Various steps of method 300 may also correspond to various steps in method 100 and method 200.

The method 300 may begin at step 310 where the consultant application may receive a query from a user, where the query may be associated with a current case that the user is working on. At step 320, the consultant application may determine a first set of similarity scores between the user's query and a plurality of queries stored in a data store. Similar to in methods 100 and 200, the first set of similarity scores may be based on a similarity between the user's query and the stored queries, and may be determined in a similar manner as described above with respect to step 120 of method 100. In various embodiments, steps 310 and 320 may correspond to steps 110 and 120 of method 100 or steps 210 and 220 of method 200.

At step 330, the consultant application may determine if any of the similarity scores in the first set of similarity scores meet a first threshold. Similar to in methods 100 and 200, the first threshold may be a query similarity threshold, and may identify how high the similarity score between the user query and a stored query should be for the queries to be considered similar to each other. Step 330 may be similar to steps 130 of method 100 and 230 of method 200 in that all the steps may include the consultant application comparing the similarity scores in the first set of similarity scores to a first threshold. However, step 330 may differ from steps 130 and 230 in that step 330 may include the consultant application considering the case where none of the similarity scores in the first set of similarity scores meets the first threshold, which may mean there are no stored queries that are similar to the user's query.

If the consultant application makes a determination at step 330 that at least one of the similarity scores from the first set of similarity scores meets the first threshold, the method 300 may proceed from step 330 to either 340 or 350. The determination that at least one of the similarity scores meets the first threshold may mean that at least one stored query is similar to the user's query. Once a stored query similar to the user's query is determined, the consultant application may either execute steps 140-180 of method 100 or steps 240-290 of method 200 to generate a response to the user's query based on the similar stored query. Whether the consultant application executes step 140-180 or 240-290 may depend on whether consideration is given to the case where none of the precedent cases associated with the stored query are similar to the current case, as described above with respect to step 270 of method 200.

If the consultant application makes a determination at step 330 that none of the similarity scores from the first set of similarity scores meet the first threshold, the method 300 may instead proceed from step 330 to step 360. This determination may mean that none of the stored queries are sufficiently similar to the user's query. At step 360, the consultant application may identify one or more sub-queries associated with the user's query. This may include decomposing the user's query into a plurality of new queries that retain one or more common characteristics or attributes of the user's original query but may be similar to one of the stored queries. The sub-queries may be identified in various manners. For example, the consultant application may break down the user's query into extracted entities and then identify new sub-queries based on the extracted entities. Specifically, the consultant application may identify new queries related to the user's query based on the extracted entities, and then the user may select one or more of the related queries for the consultant application to then generate a response to. Breaking down the user's query into extracted entities may include identifying key terms or words of importance from the user's query, which may be done using named entity recognition or by referencing a list of predetermined key terms. The consultant application may then select queries that include the same or similar entities as the user's query. Alternatively, the consultant application may use various natural language processing techniques to analyze the user's query and automatically generate one or more new queries based on an understanding of the user's query. In various embodiments, this may include applying techniques such as question generation which may allow a trained model to output similar queries as an input query before the user's query is provided to that trained model.

Once the sub-queries are identified, the method 300 may proceed to step 370 where the consultant application may determine a third set of similarity scores between the sub-queries and the stored queries. Similarity between the sub-queries and the stored queries may be determined in a similar manner in which similarity between the user's query and the stored queries was determined. For example, similarity may be based on a semantic similarity between any given sub-query and any given stored query.

At step 380, the consultant application may determine that a third similarity score from the third set of similarity scores meets the first threshold. As described above, the first threshold may be a query similarity threshold, so this step may determine whether the similarity score between any of the sub-queries and the stored queries meets the threshold, and in turn whether any of the sub-queries are similar to any stored query. It may also be the case here that more than one of the similarity scores in the third set of similarity scores meets the threshold, which may mean that more than one sub-query is determined to be similar to a stored query.

At step 390, the consultant application may generate a response to the user's original query that was received at step 310 based on the stored queries determined to be similar to the sub-queries associated with the user's query. Generating the response at this step may be similar to the process of generating the response described above, and may include one or more of steps 140-180 of method 100, or one or more of steps 240-290 of method 200.

Figure 4:
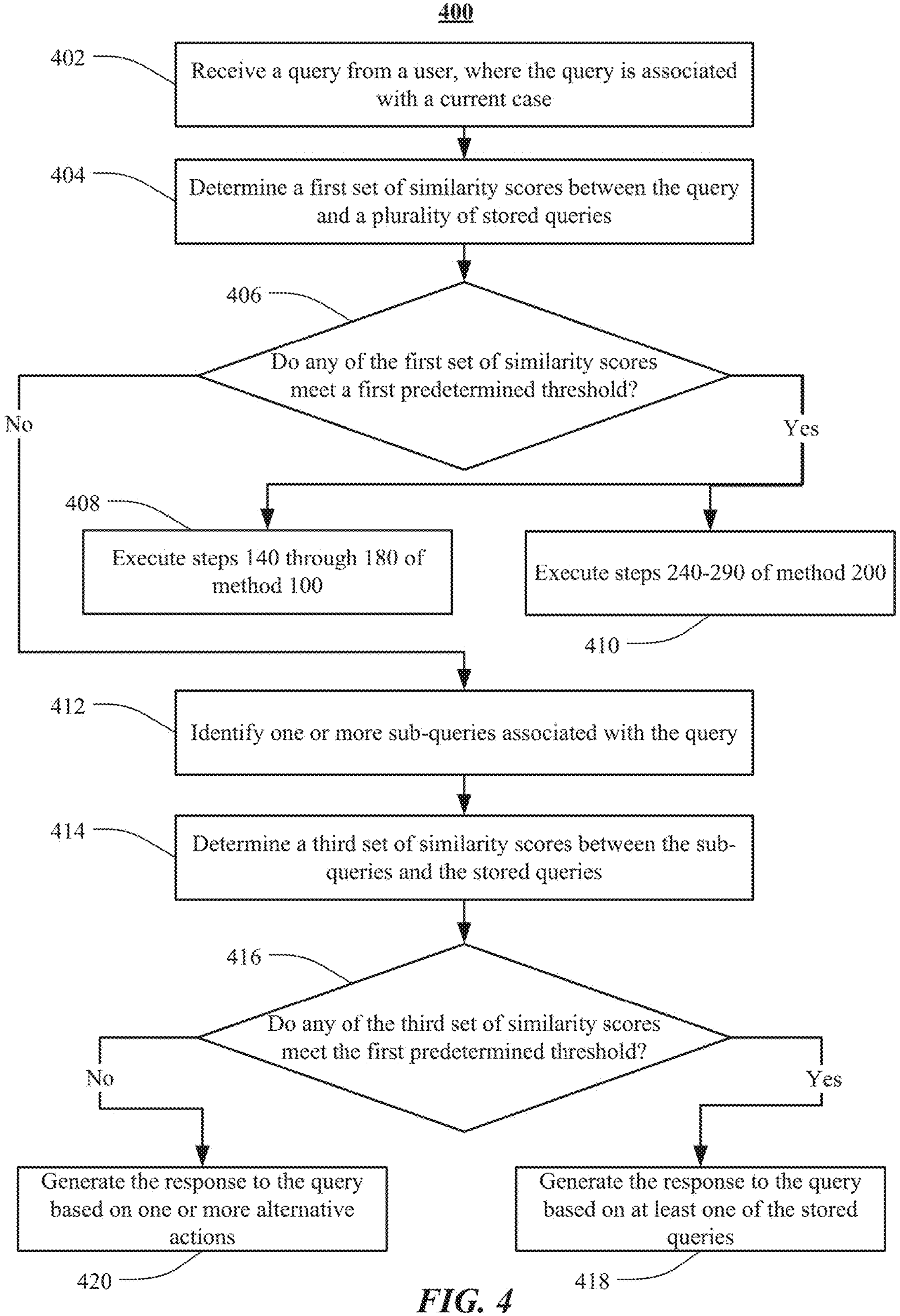
FIG. 4 illustrates a method for automatically generating responses to user queries that includes branching steps conditional on the similarity of a user's query to stored queries and the similarity of sub-queries associated with the user's query to stored queries.

FIG. 4 illustrates a method 400 for automatically generating responses to user queries that includes branching steps conditional on the similarity of a user's query to stored queries, as well as branching steps conditional on the similarity of sub-queries associated with the user's query to stored queries. Method 400 may also be executed by an application on any computing device, where the application may operate as a consultant for the user that automatically provides guidance on various questions that the user may have, and may be referenced herein as the consultant application. Various steps of method 400 may also correspond to various steps in methods 100, 200, and 300.

The method 400 may begin at step 402 where the consultant application may receive a query from a user, where the query may be associated with a current case that the user is working on. At step 404, the consultant application may determine a first set of similarity scores between the user's query and a plurality of queries stored in a data store. The first set of similarity scores may be based on a similarity between the user's query and the stored queries, and may be determined in a similar manner as described above with respect to step 120 of method 100. In various embodiments, steps 402 and 404 may correspond to steps 310 and 320 of method 300.

At step 406, the consultant application may determine if any of the similarity scores in the first set of similarity scores meet a first threshold, which may be a query similarity threshold that identifies how high the similarity score between queries should be for them to be considered similar. Similar to step 330 of method 300, step 406 may include consideration for the case where none of the similarity scores in the first set of similarity scores meets the first threshold, which may be the case where none of the stored queries are similar to the user's query.

If the consultant application makes a determination at step 406 that at least one of the similarity scores from the first set of similarity scores meets the first threshold, the method 400 may proceed to either step 408 or 410 where the consultant application may generate a response to the user's query based on stored queries similar to the user's query. Whether method 400 proceeds to step 408 or 410 may depend on whether the consultant application considers the case where none of the precedent cases associated with the stored query are similar to the current case, as described above with respect to step 270 of method 200.

If the consultant application makes a determination at step 406 that none of the similarity scores from the first set of similarity scores meets the first threshold, the method 400 may instead proceed from step 406 to step 412. At step 412, the consultant application may identify one or more sub-queries associated with the user's query. The sub-queries may be determined in a similar manner as that described above with respect to step 360 of method 300. At step 414, the consultant application executing may determine a third set of similarity scores between the sub-queries and the stored queries, similar to that of step 370 of method 300 as described above.

At step 416, the consultant application may determine whether any of the similarity scores in the third set of similarity scores meets the first threshold. As described above, the first threshold may be a query similarity threshold that may identify how high the similarity score between queries should be for the queries to be considered similar. In determining whether any of the third set of similarity scores meets the first threshold, the consultant application may determine whether any of the sub-queries associated with the user's query are similar to any of the stored queries. Thus, this step may include consideration for the case where at least one of the sub-queries is similar to a stored query, as well as the case where none of the sub-queries are similar to a stored query.

If the consultant application makes a determination that the similarity score between at least one of the sub-queries and the stored queries meets the first threshold, method 400 may proceed to step 418 where the consultant application may generate a response to the user's query based on the stored queries determined to be similar to the sub-queries associated with the user's query. Generating the response based on the stored query may be similar to the process of generating the response in steps 140-180 of method 100 described above, and thus may include one or more of steps 140-180 of method 100, or one or more of steps 240-290 of method 200. In various embodiments, step 418 may correspond to step 390 of method 300.

If the consultant application makes a determination at step 416 that none of the similarity scores between the sub-queries and stored queries meet the first threshold, method 400 may proceed to step 420 where the consultant application may generate the response to the user's query based on one or more alternative actions. The alternative actions may include steps that are different than the process of generating a response based on a similar stored query as described with respect to steps 140-180 of method 100 or steps 240-290 of method 200, which may be a result of there being no stored queries that are similar to either the query originally received from the user or the sub-queries associated with the user's query. The alternative actions may also include additional steps besides those already described in methods 100 and 200 to address the fact that no similar stored queries were identified.

Figure 5:
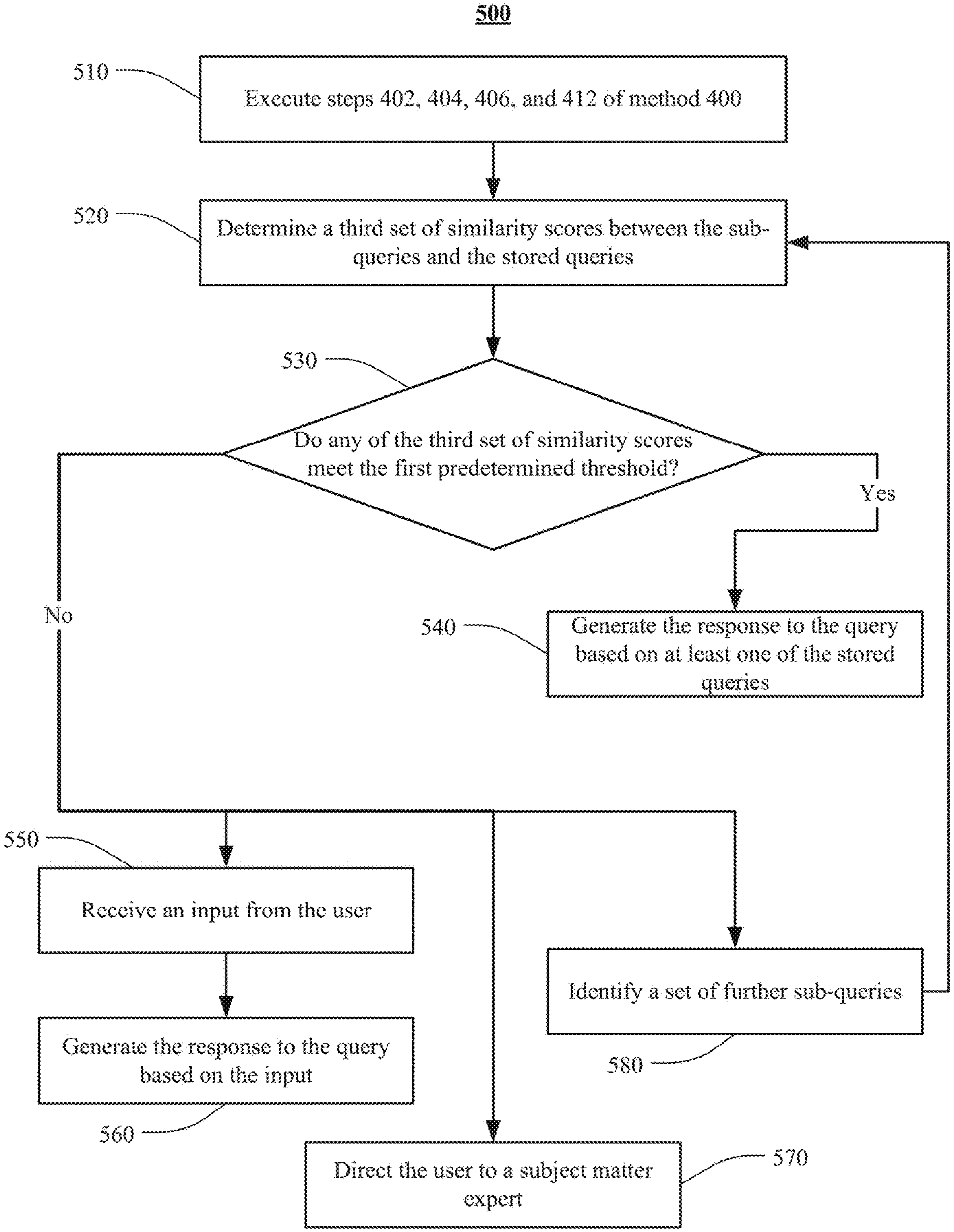
FIG. 5 illustrates a method for automatically generating responses to user queries with steps for handling cases where sub-queries of a user's query are not similar to any stored queries.

FIG. 5 illustrates a method 500 for automatically generating responses to user queries with steps for handling cases where sub-queries of a user's query are not similar to any stored queries. Method 500 may also be executed by a consultant application on any computing device, where the application may operate as a consultant for the user that automatically provides guidance on various questions that the user may have, and may be referenced herein as a consultant application. Various steps of method 500 may also correspond to various steps in methods 300 and 400.

The method 500 may begin at step 510 where the consultant application may begin by executing steps 402, 404, 406 and 412 of method 400 as the steps are described above. That is, the consultant application may receive a query from the user, and then determine a first set of similarity scores between the user's query and the stored queries. The consultant application may then determine whether the user's query is similar to any stored query by determining whether any of the first set of similarity scores meets a first threshold. Based on a determination that there is no stored query similar to the user's query, the consultant application may then identify one or more sub-queries associated with the user's query. Then, at step 520, the consultant application may determine a third set of similarity scores between the sub-queries and the stored queries.

At step 530, the consultant application may determine whether any of the similarity scores in the third set of similarity scores meet the first threshold, which may in turn mean determining whether the sub-queries are similar to any of the stored queries. If a determination is made that the similarity score between at least one of the sub-queries and the stored queries meet the first threshold, the method 500 may proceed to step 540 where the consultant application may proceed with generating a response to the user's original query based on the similar stored queries. In various embodiments, step 540 may correspond to step 418 of method 400.

If a determination is made at step 530 that none of the similarity scores between the sub-queries and the stored queries meet the first threshold, method 500 may proceed to any one of steps 550, 570, or 580. As described above, in this case where neither the user's query nor the sub-queries associated with the user's query are similar to any stored queries, generating the response to the user's query may be based on alternative actions. For example, method 500 may proceed from step 530 to step 550 where the consultant application may prompt the user (e.g., via a graphical user interface) and subsequently receive an input from the user, where the input is separate from and in addition to the query initially received from the user. The input may include a revision to (and/or a clarification of) the user's original query or to any of the sub-queries identified as part of step 510. The consultant application may provide suggested revisions and/or clarifications based on the consultant application's understanding of the user's query, and the user may in turn select one of the suggestions as their input. Alternatively, the consultant application may provide a message that simply prompts the user for input clarifying the user's original query or to any of the sub-queries (which may be provided to the user along with the message), and the user may provide a custom revision and/or clarification to the user's original query or to any of the sub-queries associated with the original user's query. At step 560, the consultant application may then generate the response to the user's original query based on the input that was just received from the user. Generating the response may still include comparing the user's query or associated sub-queries to the stored queries, and obtaining and comparing the case information for the current case and precedent cases. That is, step 560 may include one or more steps of methods 100 through 400, where specific steps included may depend on subsequent similarity comparisons in light of the input from the user. In various embodiments where the input from the user may be directed to the sub-queries associated with the user's original query, the flow of method 500 may also return from step 560 back to step 520. The consultant application may then determine at step 530 that the sub-queries are similar to at least one stored query as a result of the input received at step 550 and proceed to generate a response based on the similar stored queries at step 540. On the other hand, the consultant application at step 530 may again determine that none of the stored queries are similar to the sub-queries despite the user's input, and may again return to step 550 to receive further input from the user. This loop may repeat until a predetermine condition is satisfied, such as a response being able to be generated without additional input, or a limit is reached on the number of additional inputs from the user, in which case the flow of method 500 may transfer to one of the other steps, as described further below.

If a determination is made at step 530 that none of the similarity scores between the sub-queries and the stored queries meet the first threshold, method 500 may additionally or alternatively proceed to step 570 where the consultant application may direct the user to a SME to generate and provide a response to the user's query. This may include altering the response to the user's query to include a recommendation to consult with a SME. The consultant application may also automatically establish a communicative connection between the user and a SME, which may include re-routing the connection with the user's device to the device for a SME, among many others. In various embodiments, step 570 may be taken as a last resort after the consultant application has exhausted all other options, such as after a limit has been reached for the number of times that additional input is received from the user (from step 550 as described above) or after a limit has been reached for the number of times that further sub-queries are identified (from step 580 as described below). The limits applied may be based on a limited number or iterations, a limited amount of time, and/or a limited amount of processing resources. In various other embodiments, step 570 may also be taken as the default, such that a determination at step 530 that none of the sub-queries are similar to the stored queries may lead directly to step 570.

When the communicative connection is established between the user and the SME, the consultant application may complete tracking of the user's engagement information. The engagement information may then be forwarded to the SME to help the SME generate a response to the user's query. The consultant application may also analyze the engagement information to improve various aspects of the automatic response generation process. In various embodiments, the engagement information may include any information that the user inputted to the consultant application. The engagement information may include information associated with the user's query, the current case, or the user themselves. The engagement information may also include features about the user's interaction with the consultant application, as tracked through the user's device. This may include a number of user inputs received in addition to the user's original query or the extent that the additional user inputs differ from the user's original query, among many others.

In various embodiments, receiving additional input from the user or directing the user to a SME may also be performed as an earlier step in the method 500. While method 500 thus far has been described with steps 550 and 570 being options after the consultant application makes a determination that the user's query is not similar to any stored queries (as a result of step 406 of method 400), after sub-queries are identified (as a result of step 412 of method 400), and after the sub-queries also determined to not be similar to any stored queries (as a result of step 530), steps 550 and 570 may also be alternative options directly after the user's query is determined to not be similar to any stored queries. That is, after the user's query is determined to not be similar to any stored queries as a result of step 406 of method 400, the consultant application may have the option to (1) identify sub-queries associated with the user's query corresponding to step 412, (2) prompt and receive input from the user corresponding to step 550, or (3) direct the user to a SME corresponding to step 570. In such cases, this may mean that the consultant application may prompt and receive input from the user, or direct the user to a SME, directly after the user's query is determined to not be similar to any stored queries.

Referring back to the flow of method 500 as illustrated, if a determination is made at step 530 that none of the similarity scores between the sub-queries and the stored queries meet the first threshold, method 500 may also proceed to step 580 where the consultant application may identify a set of further sub-queries, where each of the further sub-queries are also associated with the user's query. This may include decomposing the initial set of sub-queries identified as a result of step 412 of method 400 into new queries that retain the general substance of that initial set of sub-queries as well as the user's original query. Thus, the further sub-queries may be sub-sub-queries with respect to the user's original query. The further sub-queries may also be identified in a similar manner as how the sub-queries are identified as part of step 412 of method 400. The consultant application may also process the set of further sub-queries in a similar manner as the initial set of sub-queries identified in step 412. This may include determining whether the further sub-queries are similar to any stored queries, and if so, generating a response to the user's original query based on the stored queries that are similar to the further sub-queries. As such, the flow of method 500 may return from step 580 back to step 520, where the consultant application may determine another set of similarity scores between the set of further sub-queries and the stored queries. As the flow of method 500 continues after returning to step 520, it may once again return to step 580 if a determination is made once again at step 530 that none of the further sub-queries are similar to the stored queries. This repetition of steps 520, 530, and 580 may allow the consultant application to recursively identify sub-queries and check if any stored queries are similar to the recursively identified sub-queries. The loop may continue until a predetermined condition is satisfied, such as a similar stored query being identified, the recursion reaching a point where no further sub-queries may be identified, or a limit on the number of recursive steps has been taken without a similar stored query being identified. When the condition is reached, method 500 may then proceed to either step 540 or 570.

Figure 6:
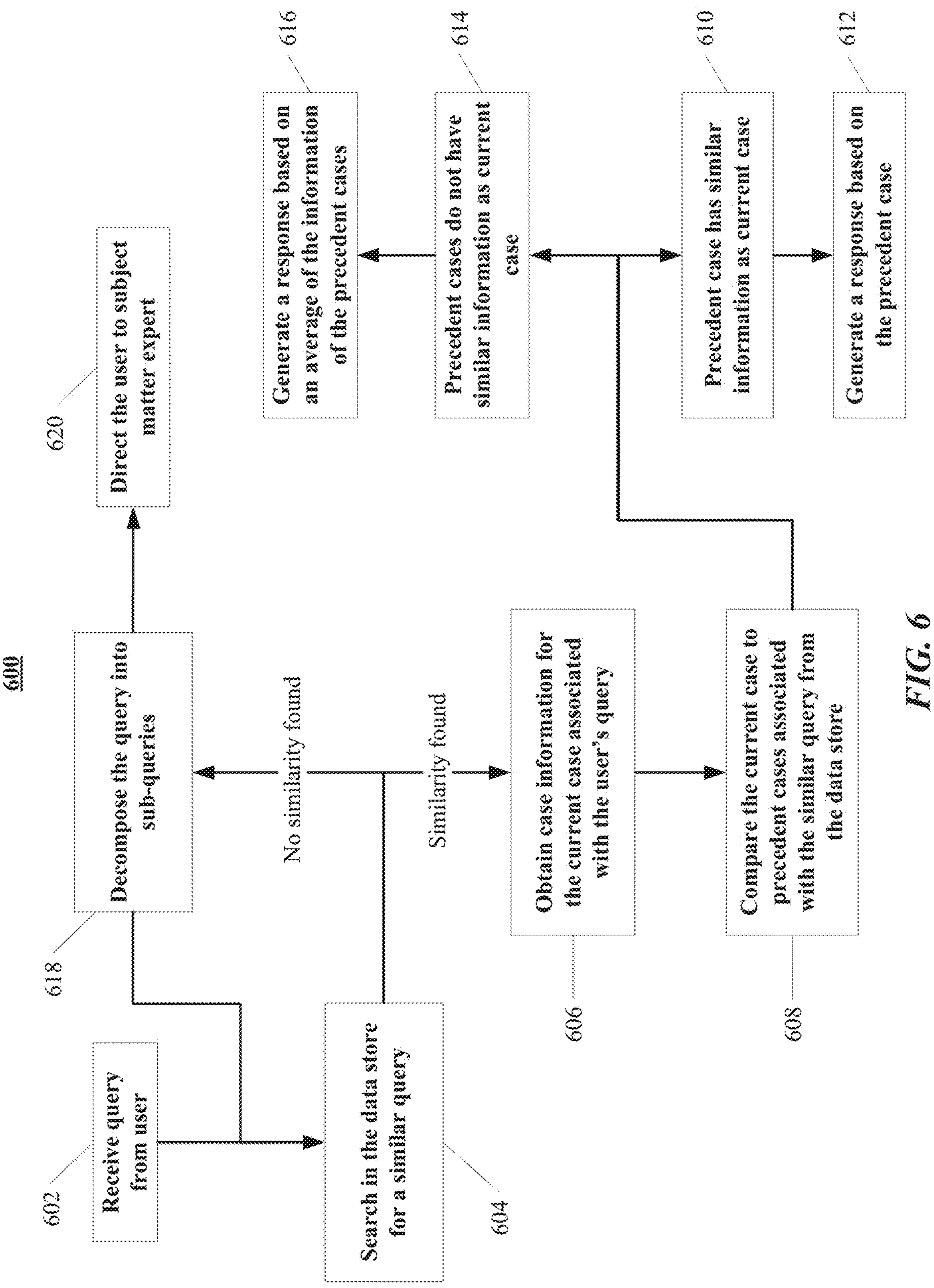
FIG. 6 illustrates a flow schematic of the various flows that a consultant application may take in automatically generating responses to user queries.

FIG. 6 illustrates a flow schematic 600 of the various flows that a consultant application may take in automatically generating responses to user queries. The flow may begin at 602 where the consultant application may receive a query from a user. In various embodiments, this may correspond to steps 110, 210, 310, and 402 of methods 100, 200, 300, and 400, respectively. At 604, the consultant application may search a data store for a query that is similar to the query received from the user. In various embodiments, this may correspond to step 120 of method 100, step 220 of method 200, steps 320 and 330 of method 300, and steps 404 and 406 of method 400.

If a similarity is found between the user's query and a stored query from the data store, then at 606, the consultant application may obtain case information for the current case associated with the user's query. In various embodiments, a similarity being found between the user's query and the stored query may correspond to steps 130 and 230 of methods 100 and 200, respectively, and a positive determination at steps 330 and 406 of methods 300 and 400, respectively. Obtaining case information for the current case at 606 may correspond to steps 140 and 240 of methods 100 and 200, respectively. After the case information for the current case is obtained, at 608, the consultant application may compare the current case to precedent cases associated with the similar stored query from the data store. In various embodiments, this may correspond to steps 150 and 160 of method 100, and steps 250 and 260 of method 200.

One outcome from the comparison of 608 may be the flow proceeding to 610, where a precedent case has similar case information as the current case. In various embodiments, this may correspond to step 170 of method 100 and a positive determination at step 270 of method 200. The consultant application at 612 may then generate a response to the user's query based on that similar precedent case. In various embodiments, this may correspond to steps 180 and 280 of methods 100 and 200, respectively. On the other hand, another outcome of the comparison of 608 may be the flow proceeding to 614, where the precedent cases do not have similar case information as the current case. In various embodiments, this may correspond to a negative determination at step 270 of method 200. The consultant application at 616 may then generate a response to the user's query based on an average of the case information of the precedent cases associated with the similar query from the data store. In various embodiments, this may correspond to step 290 of method 200.

Returning back to 604, if no similarity is found between the user's query and any stored query, then at 618, the consultant application may decompose the user's query into sub-queries. In various embodiments, this may correspond to step 360 of method 300 and step 412 of method 400. The flow may then return back to 604 where the consultant application may search the data store for queries that are similar to the decomposed sub-queries. If a similarity is found between a stored query and the sub-queries from 618, the consultant application may then proceed from 606 through 616. In various embodiments, the sequence from 618 to 604 and then to 606 may correspond to steps 370 to 390 of method 300, steps 414, a positive determination at 416, and 418 of method 400, and steps 520, a positive determination at 530, and 540 of method 500. On the other hand, if no similarity is found again between the stored queries and the sub-queries, the consultant application may once again decompose each of the sub-queries into further sub-queries upon returning to 618. In various embodiments, the loop between 604 and 618 may correspond to steps 520, a negative determination at 530, and 580 of method 500. If decomposition into sub-queries is no longer possible or otherwise not performed, then at 620, the consultant application may direct the user to a subject matter expert to provide a response to the user's original query. In various embodiments, this may correspond to step 570 of method 500.

Figure 7:
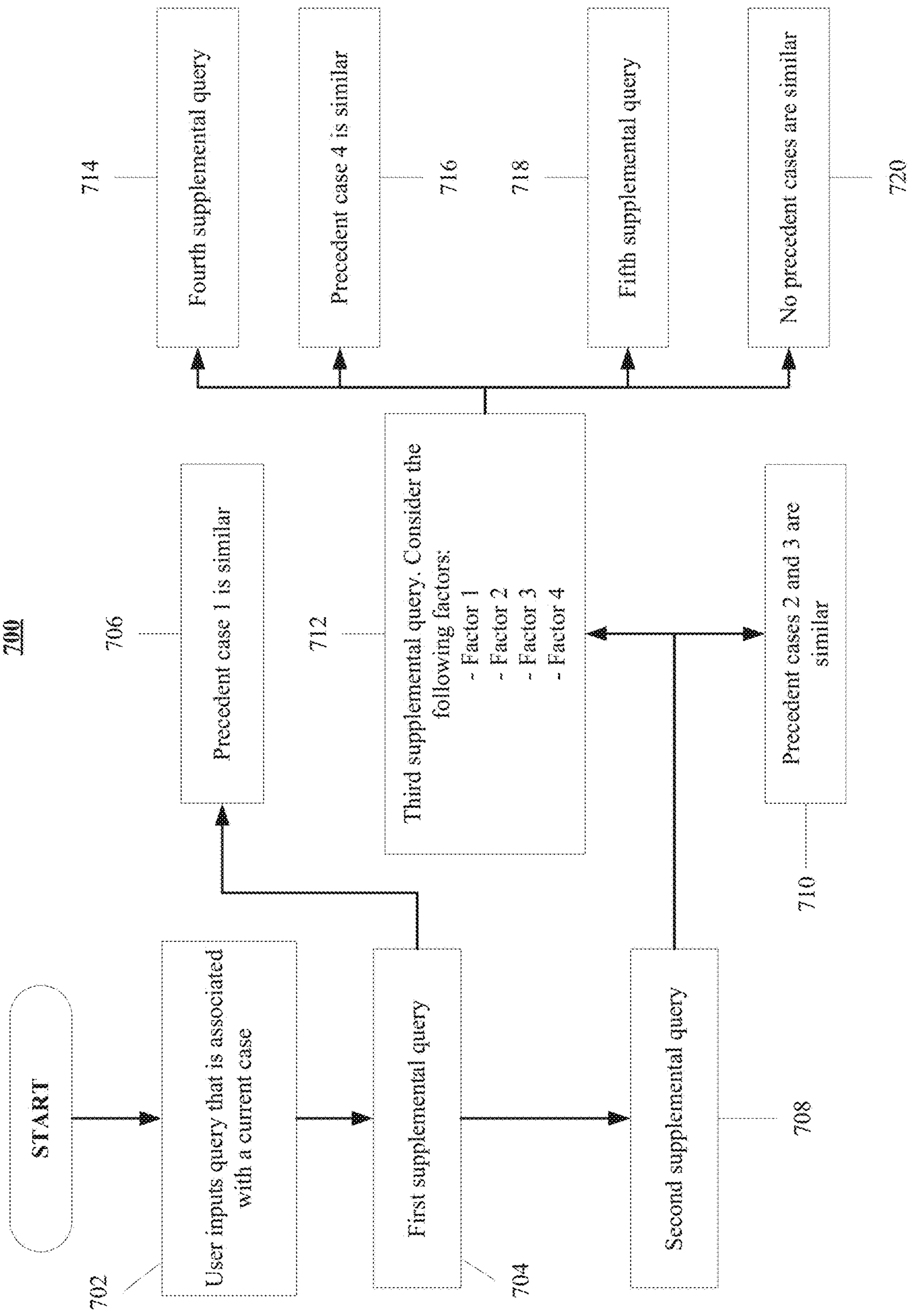
FIG. 7 illustrates a flow schematic of an exemplary process of obtaining case information for a current case that is responsive to the supplemental queries associated with a stored query that is similar to the user's query.

FIG. 7 illustrates a flow schematic 700 of an exemplary process of obtaining case information for a current case that is responsive to the supplemental queries associated with a stored query that is similar to the user's query. The flow may begin at 702 where a user may provide a query to the consultant application. The user's query may be associated with a current case that the user is working on, and may be any type of case, such as a financial case. Assuming that a stored query that is similar to the user's query is found, the consultant application may proceed with obtaining case information about the current case using the supplemental queries associated with the similar stored query.

At 704, the first supplemental query may be provided to the user to prompt the user for additional information about the case associated with the query they provided. The user may then provide a response to the first supplemental query, such as through a user interface associated with the consultant application. The flow may then proceed to 706 as the consultant application may be able to determine that a first precedent case is similar to the current case based on the case information the user just provided.

On the other hand, based on the case information the user provides, the flow may instead proceed to 708 where the consultant application may then seek to obtain information responsive to a second supplemental query. This may be the case if the case information the user provided was insufficient for determining which, if any, precedent cases are similar to the current case, and/or that particular precedent cases like precedent case 1 is not similar to the current case. While the consultant application may have provided the first supplemental query to the user at 704 and then received a response from the user with the relevant information, the consultant application at 708 may automatically access a data store to retrieve information associated with the user and/or the current case and which is also responsive to the second supplemental query. More generally, the consultant application may have the option of prompting the user for a response to a supplemental query or automatically retrieving information responsive to a supplemental query for each of the supplemental queries associated with the stored query that is similar to the user's query. In various embodiments, the consultant application may default to automatically retrieving information from the data store, and only prompt the user for a response to a supplemental query if the relevant information was not available to be automatically retrieved.

Referring back to the flow schematic 700, the case information obtained in response to the second supplemental query at 708 may allow the flow to proceed to 710 where the consultant application may determine that two precedent cases are similar to the current case. On the other hand, the case information obtained may also instead cause the flow to proceed to 712 if the case information responsive to both the first and second supplemental queries are insufficient in determining whether any precedent cases are similar to the current case. At 712, a third supplemental query may then be used to further obtain case information on the current case. The third supplemental query may also be associated with the stored query that is similar to the user's query received at 702, and may include one or more factors to consider along with the third supplemental query. In various embodiments, the factors may be sub-queries that inform what a response to the third supplemental query may be, or the factors may be additional sub-queries for soliciting additional information relevant to the third supplemental query, among many others.

Whether the third supplemental query, and potentially the associated factors, are provided to the user to prompt for a response or the relevant information is automatically retrieved from a data store, there may be multiple possible flows depending on the information obtained. Certain information may lead to additional supplemental queries such as a fourth supplemental query at 714 or a fifth supplemental query at 718. The flow may continue with additional case information being obtained in response to the fourth and fifth supplemental queries, which may eventually allow the consultant application to determine if any precedent cases are similar to the current case. Other information may allow the consultant application to determine that a particular precedent case is similar to the current case at 716. The case information obtained in response to the third supplemental query may also allow the consultant application to determine that there are no precedent cases similar to the current case at 718.

It may be noted that the flow schematic 700 also illustrates that later supplemental queries used to obtain case information may change depending on the case information received in response to earlier supplemental queries. That is, the later supplemental queries that the consultant application selects to provide to the user may depend on the earlier supplemental queries provided to the user and the corresponding responses to those earlier supplemental queries. For example, after case information is received in response to the first supplemental query at 704, a similar precedent case may be identified at 706, in which case the second supplemental query may not be utilized. This may mean that not all of the supplemental queries associated with the similar stored query is utilized to obtain case information about the current case, and that the particular supplemental queries utilized may be conditional on user responses to the earlier supplemental queries that are provided to them and/or case information automatically retrieved in response to earlier supplemental queries. Certain supplemental queries may be more commonly used earlier than others, such as the first supplemental query at 704, where the case information obtained in response to those earlier supplemental queries may influence which supplemental queries are utilized later, such as the fourth and fifth supplemental queries, which may only be utilized as a result of receiving certain case information to the first, second, and third supplemental queries.

To this end, various embodiments may implement the supplemental queries associated with a stored query as a decision tree to allow for various supplemental queries to be utilized conditionally based on the responses to other supplemental queries as described herein.

Figure 8:
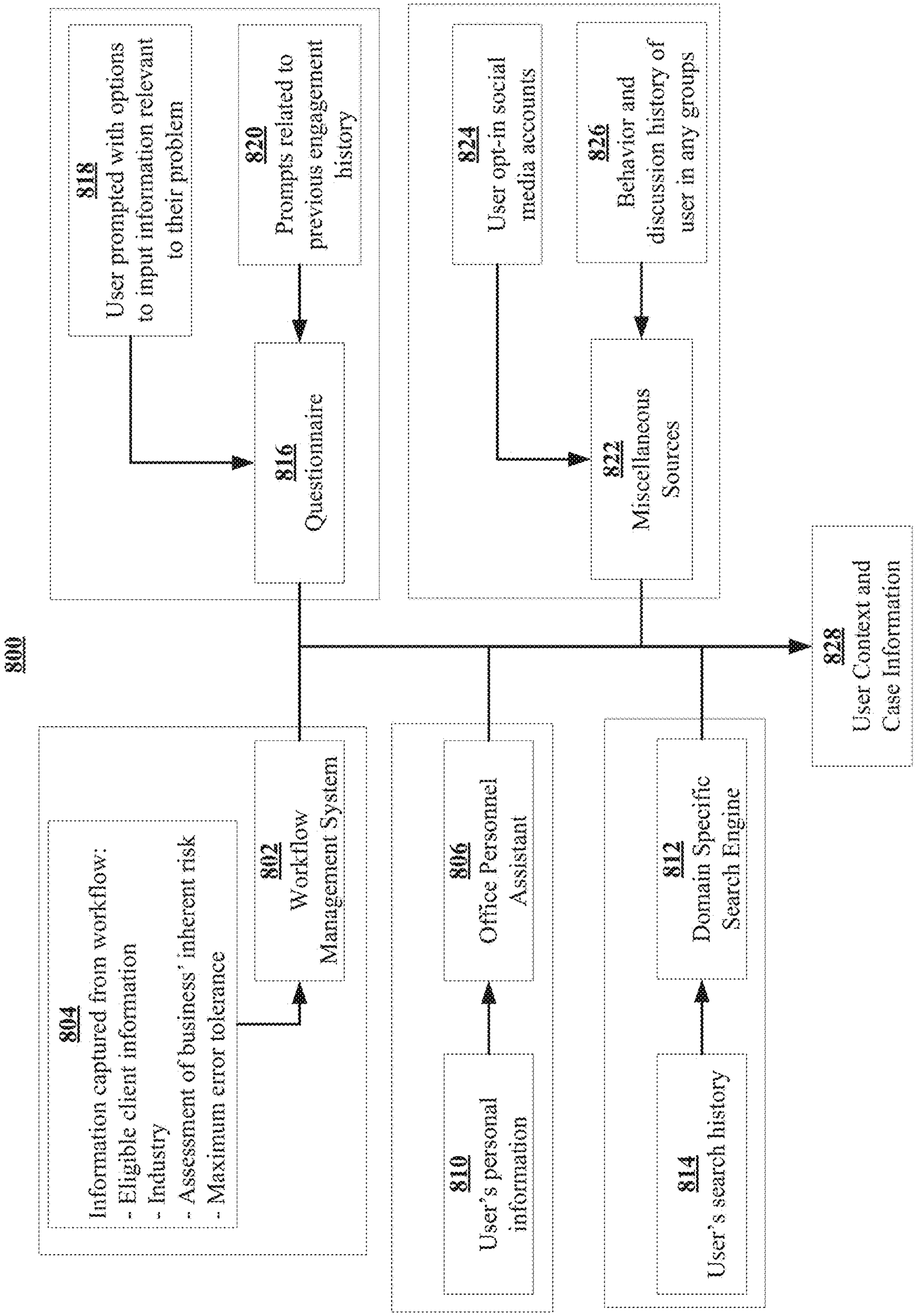
FIG. 8 illustrates a system schematic of various components that may allow the consultant application to automatically obtain case information for a current case associated with a user's query.

FIG. 8 illustrates a system schematic 800 of various components that may allow the consultant application to automatically obtain case information for a current case associated with a user's query. The system schematic 800 may illustrate the various tools, programs, applications, etc. that may operate in the same overall ecosystem as the consultant application, which may track and record various aspects about the user and any cases the user is working on, which the consultant application may subsequently access to obtain the relevant information that is responsive to the supplemental queries associated with a stored query.

For example, a workflow management system 802 may capture information on the workflow of the user that provided a query to the consultant application. The information captured from the workflow 804 may include information about the case, such as any eligible information about the client in the current case associated with a user's query, the industry that the current case may be in, an assessment of the inherent risk of the business in the current case, or the maximum error tolerance for the client of the current case. This information may be captured automatically as the user goes about their normal workflow, stored in a data store, and subsequently retrieved by the consultant application in response to supplemental queries to help determine if any precedent cases are similar to the current case.

Additionally, an office personnel assistant 806 may track the personal information of various users in a firm or company, and when the consultant application receives a query from a particular user, that user's personal information 810 may be responsive to certain supplemental queries and retrieved accordingly. Similarly, a domain specific search engine 812 may also store the search histories of various users, and a particular user's search history 814 may be retrieved in response to certain supplemental queries.

A questionnaire system 816 may also be used to obtain additional information on the user and/or the current case. The questionnaire may allow the user to input relevant information using various options 818 and the questionnaire prompts may be related to the user's previous engagement history 820. Various other miscellaneous sources 822 may also be used to obtain user and/or case information. For example, the user may opt-in to certain social media accounts 824 being prompted for information, or the behavior and discussion history of a user in various groups 826 being queried for information.

Together, the information from these various sources may allow the consultant application to obtain user context and case information which may be responsive to various supplemental queries and may help determine any precedent cases similar to the current case that a user is working on.

Figure 9:
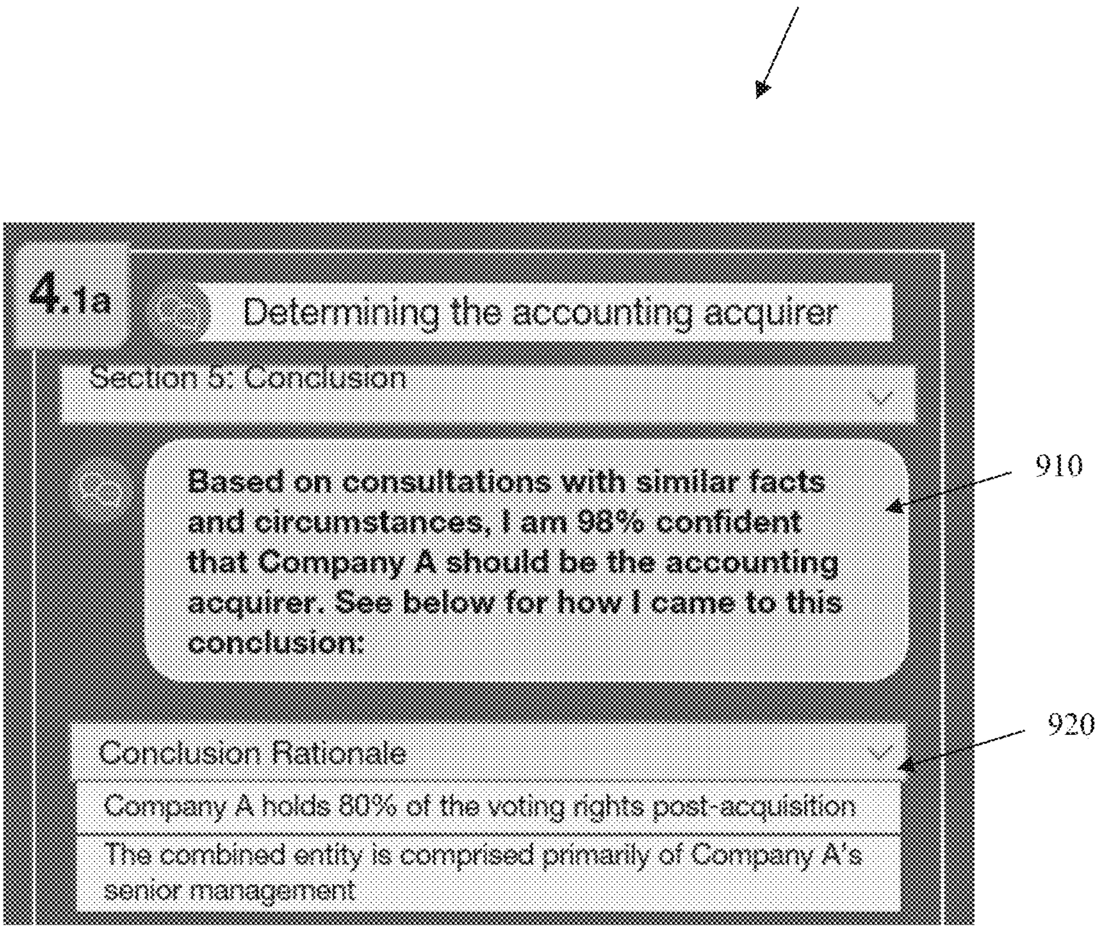
FIG. 9 illustrates a user interface with an exemplary response that may be generated by the consultant application for a user's query.

FIG. 9 illustrates a user interface 900 with an exemplary response that may be generated by the consultant application for a user's query. After receiving the user's query, and assuming one or more precedent cases were determined to be similar to the current case, the consultant application may generate a response 910 to the user's query and provide the response to the user through the user interface 900. The response 910 may include a conclusion that may be an answer directed to the user's original query, as well as a confidence score on how confident the consultant application is that the conclusion is accurate in light of the available information from the current case and precedent cases. The confidence score may be determined in various manners. For example, and as described above with respect to FIG. 1, the confidence score may correspond to the probability for one of the labels/classes in the output of a logistic regression model. In the response 910, the conclusion may be that company A should be the accounting acquirer, which may be a response to a user's query regarding which of multiple companies should be considered the acquirer in a financial deal for accounting purposes. The response 910 may also include a confidence score of 98%, indicating that the consultant application is very confident that the conclusion is accurate in this example. The consultant application may also generate and provide a rationale 920 alongside the response 910 to indicate how the response 910 was generated. In various embodiments, the rationale 920 may be additional text, and may be shorter if the user's query and corresponding response 910 are simple, but the rationale 920 may also be more complex with more components if the user's query and corresponding response 910 are more complex.

Figure 10:
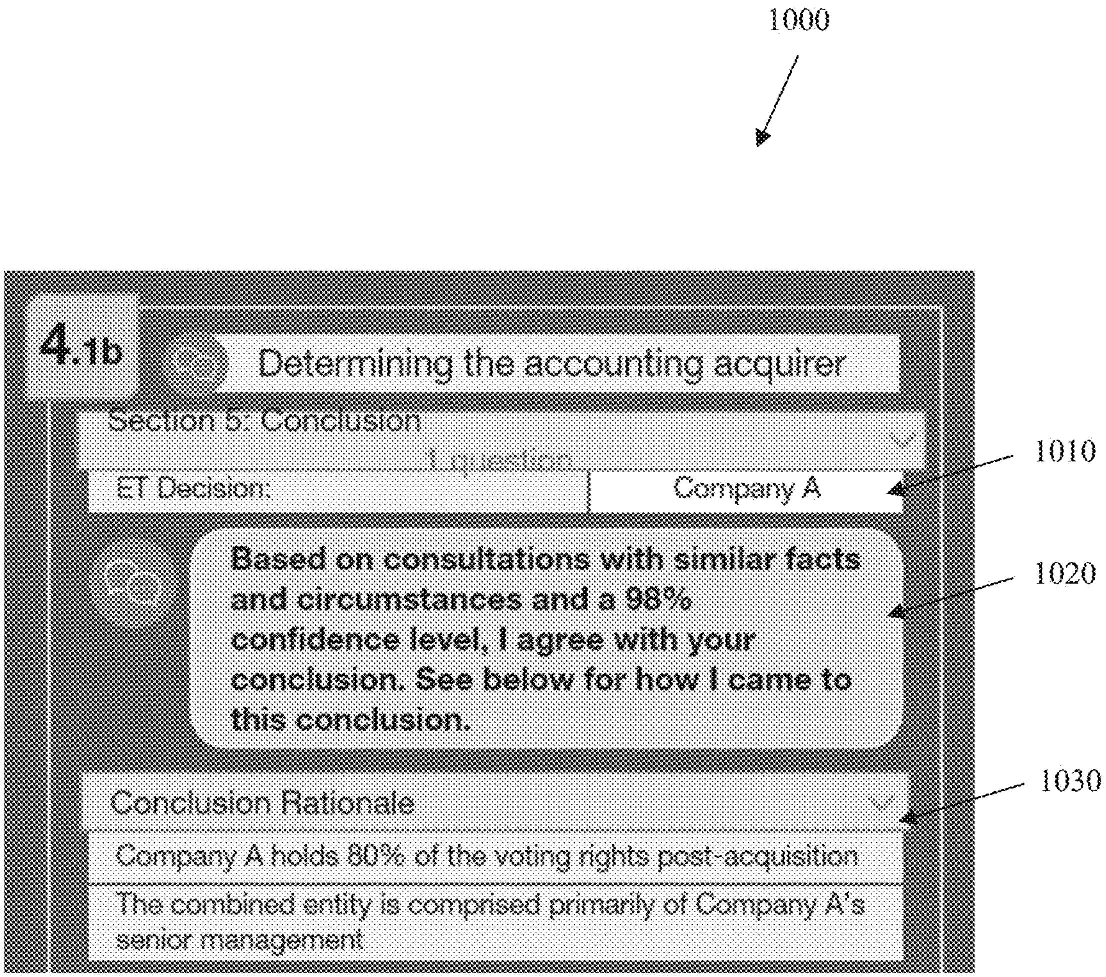
FIG. 10 illustrates a user interface where the response by the consultant application may be generated in response to a user's preliminary conclusion to their own query.

FIG. 10 illustrates a user interface 1000 where the response by the consultant application may be generated in response to a user's preliminary conclusion to their own query. In this example, besides a query, the user may also provide a preliminary conclusion 1010 that the user believes to be the accurate conclusion for their query. The consultant application may then proceed through the same process of generating a response 1020, but instead of including a conclusion like that in response 910, the conclusion in the response 1020 may be an agreement or disagreement by the consultant application on whether the user's preliminary conclusion 1010 is accurate. In this example, the user's preliminary conclusion 1010 may be that company A should be the accounting acquirer, and since the consultant application may have arrived at the same conclusion based on the case information and any similar precedent cases, the conclusion in the response 1020 may be an agreement with the user's preliminary conclusion 1010. The response 1020 may also include a confidence score on how confident the consultant application is in its agreement or disagreement, and the response 1020 may also be accompanied by the rationale 1030 for the agreement or disagreement in the response 1020.

Figure 11:
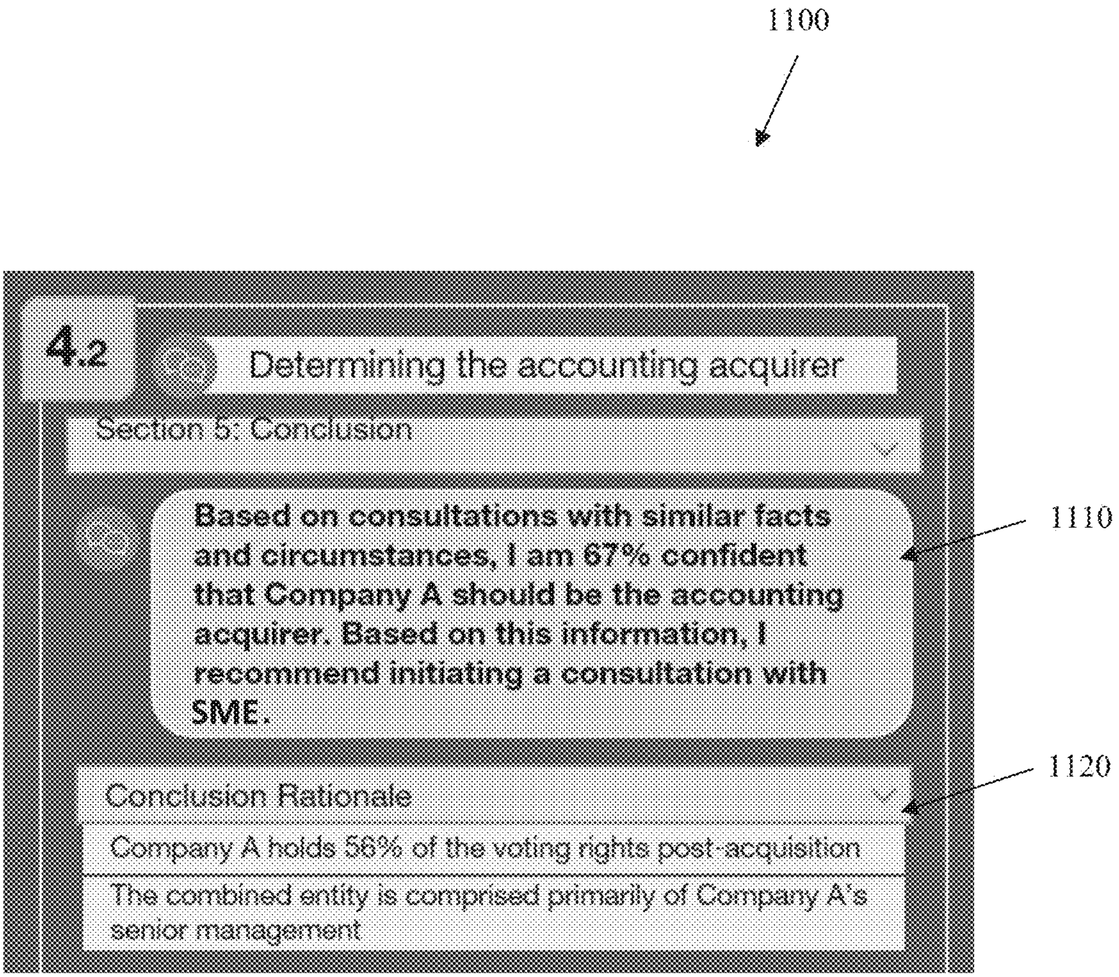
FIG. 11 illustrates a user interface with an exemplary response that may have a low confidence score.

FIG. 11 illustrates a user interface 1100 with an exemplary response that may have a low confidence score. In this example, the consultant application may have also generated a response 1110 to a user's query as there may have also been one or more precedent cases that were determined to be similar to the current case. However, the confidence score for this response may only be 67%, indicating that the consultant application is not as confident that the conclusion in the response 1110, which may still be that company A should be the accounting acquirer, is correct. This may be because even though the conclusion in the response 1110 may still be that company A should be the accounting acquirer, the specific case information for the current case and any similar precedent cases influence how confident the consultant application is that the provided conclusion is accurate. Because of the lower confidence score, the response 1110 may also include a recommendation that the user consult with an SME. The consultant application may compare the confidence score against a predetermined confidence threshold, where a score that does not meet the confidence threshold may be accompanied by a recommendation to consult with an SME. However, even with the lower confidence score, a rationale 1120 for the response 1110 may still be generated and provided to the user.

Figure 12:
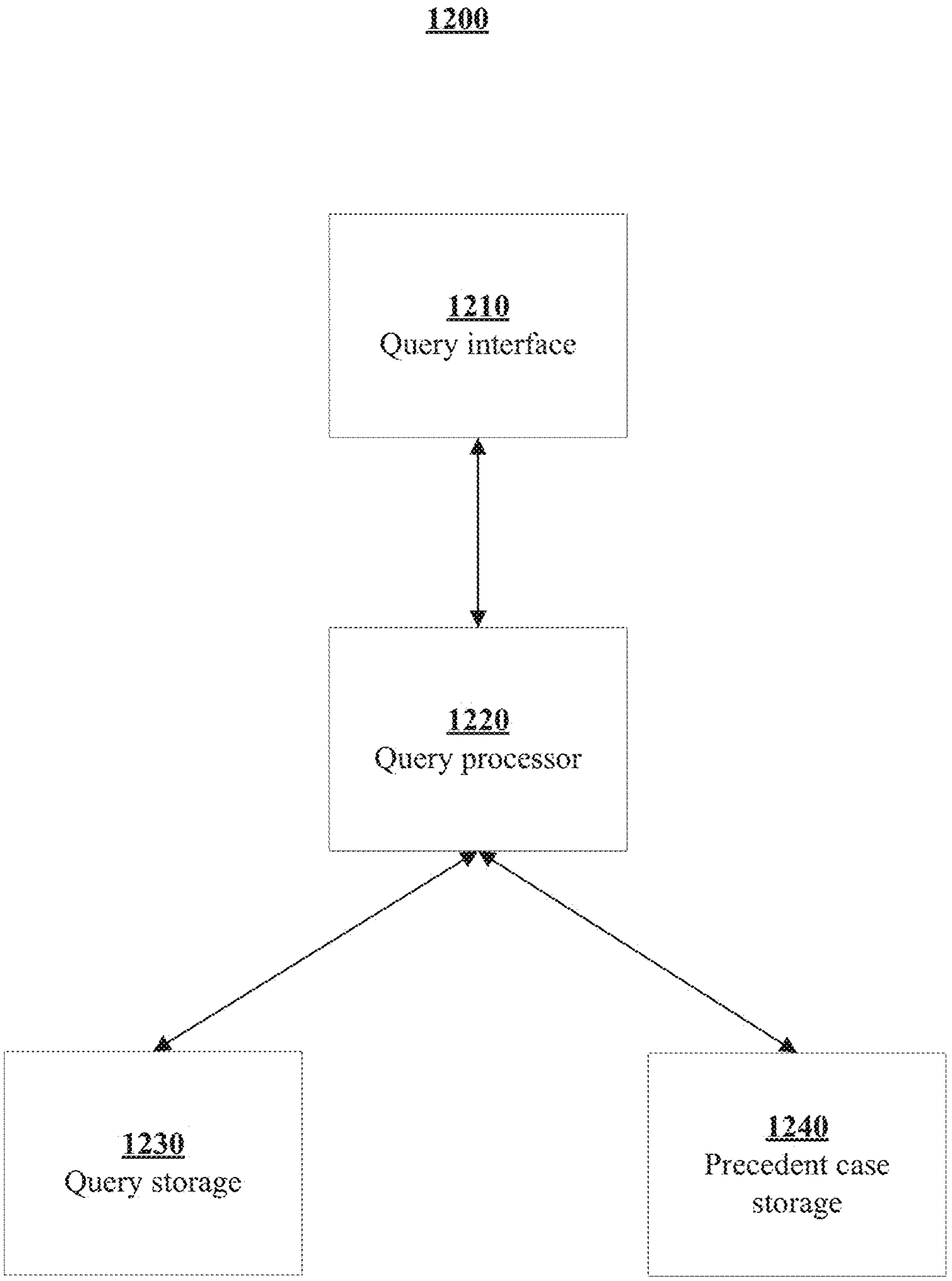
FIG. 12 illustrates a schematic of an exemplary system for automatically generating responses to user queries.

FIG. 12 illustrates a schematic of an exemplary system 1200 for executing an artificial-intelligence-based consultant application. System 1200 may execute all or part of any one or more of the techniques described herein, including automatically generating responses to user queries. System 1200 may execute one or more of the methods described above in various embodiments. The system 1200 may include a query interface 1210 that receives input from users to allow users to interact with the consultant application. Query interface 1210 may include a graphical user interface that may be provided, for example, on a user's electronic device. As such, the query interface 1210 may be the component that receives the query from a user, as well as various additional information about the current case associated with a query. The query interface 1210 may also provide the response for the user's query to the user. This may mean the query interface 1210 executes steps such as 110 and 180 of method 100, and 210 and 280 of method 200. In various embodiments, the query interface 1210 may include a display, a keyboard, a mouse, or a microphone, among many other components capable of receiving user input.

The system 1200 may include a query processor 1220 in communication with the query interface 1210. The query processor 1220 may handle the various processing steps associated with the user's query in accordance with one or more steps of the methods described above as part of generating a response to the user's query. For example, the query processor 1220 may convert the user's query from a human readable format to a format more suitable for the system 1200. The query processor 1220 may also compare the user's query to stored queries and determine if there are any stored queries similar to the user's query. The query processor 1220 may also obtain case information for the current case associated with the user's query, and also use that case information to compare the current case to precedent cases to determine if there are any precedent cases similar to the current case. The query processor 1220 may also handle decomposing user queries and identifying subqueries in cases where no stored queries are determined to be similar to the initial user's query. The query processor 1220 may also handle automatically retrieving information associated with the current case, which may include accessing or communicating with various components of the system schematic 800 of FIG. 8. The query processor 1220 may also generate the response to the user's query, and may subsequently return the response to the query interface 1210 where it may be accessible by the user. This may mean the query processor 1210 executes various steps of the methods described above, such as steps 120-180 of method 100, 220-290 of method 200, 320-390 of method 300, 404-420 of method 400, and 510-570 of method 500.

The system 1200 may also include a query storage 1230 that stores the various queries that a user's query may be compared to. The query processor 1220 may access the query storage 1230 when determining whether the user's query is similar to any stored query. The system 1200 may also include a precedent case storage 1240 that stores the precedent cases associated with the stored queries in the query storage 1230. The query processor 1220 may also access the precedent case storage 1230 when determining whether the current case associated with the user's query is similar to any precedent cases.

As described above with respect to the methods, each of the stored queries in the query storage 1230 may be associated with one or more precedent cases. In various embodiments, the stored queries in the query storage 1230 may include various labels (such as a precedent case's unique identification number) for the precedent cases associated with a given stored query, which may be used to identify the corresponding precedent cases in the precedent case storage 1240. Alternatively, the stored queries in the query storage 1230 may include an activatable link directly referencing the associated precedent cases in the precedent case storage 1240, such that the query processor 1220 may be able to access the precedent cases associated with a stored query via the stored query in the query storage 1230, without directly searching through the precedent case storage 1240. Additionally, even though the exemplary system 1200 is illustrated with a separate query storage 1230 and precedent case storage 1240, various embodiments of the system 1200 may include a single storage component that combines the query storage 1230 and precedent case storage 1240. This may allow the stored queries and precedent cases to be stored in a single location.

Figure 13:
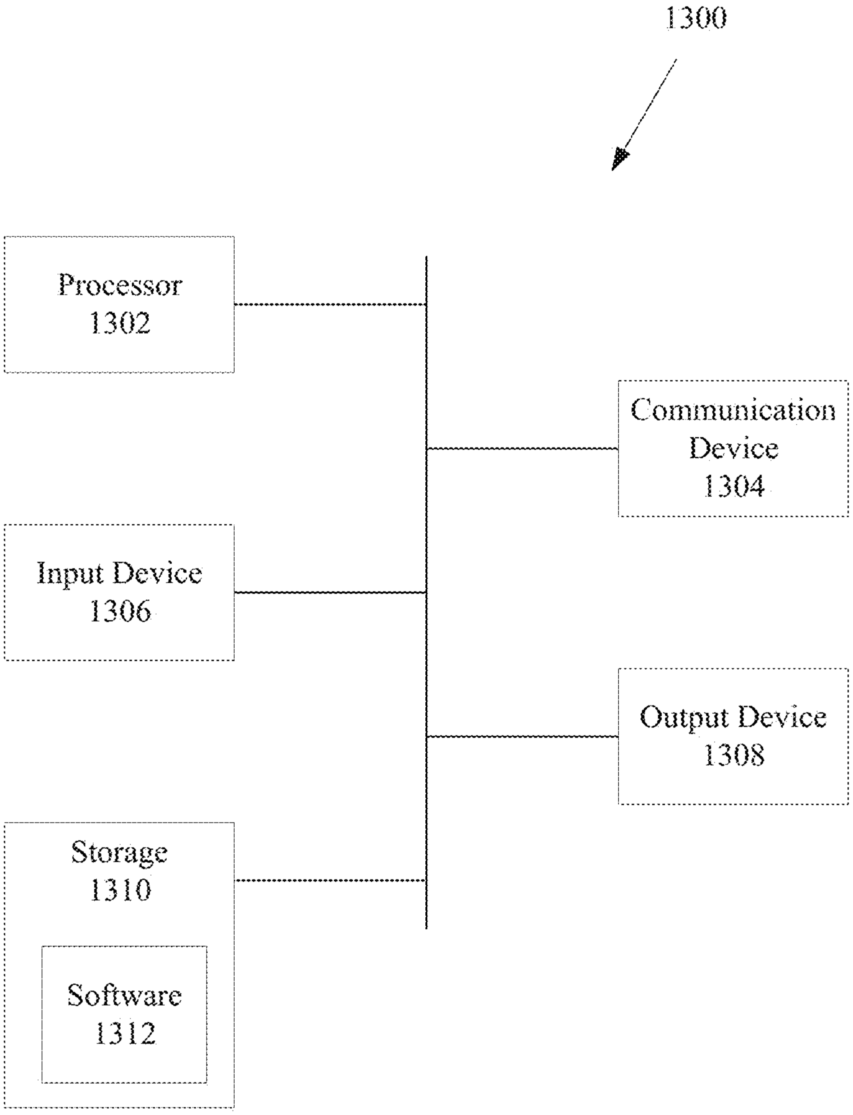
FIG. 13 illustrates an example of a computing system.

FIG. 13 illustrates an example of a computing system 1300, in accordance with one or more examples of the disclosure. Computing system 1300 can be a computer connected to a network. Computing system 1300 can be a client computer or a server. As shown in FIG. 13, computing system 1300 can be any suitable type of microprocessor-based device, such as a personal computer, workstation, server, or handheld computing device (portable electronic device) such as a phone or tablet, or dedicated device. The computing system can include, for example, one or more of processors 1302, input device 1306, output device 1308, storage 1310, and communication device 1304. Input device 1306 and output device 1308 can generally correspond to those described above and can either be connectable or integrated with the computer.

Input device 1306 can be any suitable device that provides input, such as a touch screen, keyboard or keypad, mouse, or voice-recognition device. Output device 1308 can be any suitable device that provides output, such as a touch screen, haptics device, or speaker.

Storage 1310 can be any suitable device that provides storage, such as an electrical, magnetic, or optical memory, including a RAM, cache, hard drive, removable storage disk, or other non-transitory computer readable medium. Communication device 1304 can include any suitable device capable of transmitting and receiving signals over a network, such as a network interface chip or device. The components of the computing system can be connected in any suitable manner, such as via a physical bus or wirelessly.

Processor(s) 1302 can be any suitable processor or combination of processors, including any of, or any combination of, a central processing unit (CPU), field programmable gate array (FPGA), and application-specific integrated circuit (ASIC). Software 1312, which can be stored in storage 1310 and executed by processor 1302, can include, for example, the programming that embodies the functionality of the present disclosure (e.g., as embodied in the devices as described above).

Software 1312 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1310, that can contain or store programming for use by or in connection with an instruction execution system, apparatus, or device.

Software 1312 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Computing system 1300 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computing system 1300 can implement any operating system suitable for operating on the network. Software 1312 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A system for automatically generating responses to user queries, the system comprising:

one or more processors; and a memory coupled to the one or more processors comprising instructions executable by the one or more processors, the processors operable when executing the instructions to:

receive a query from a user, wherein the query is associated with a current case;

determine a first set of similarity scores between the query and a plurality of stored queries stored in a data store, wherein each of the plurality of stored queries is associated with one or more precedent cases;

determine whether a first similarity score of the first set of similarity scores meets a first threshold, wherein the first similarity score is associated with a first stored query of the plurality of stored queries;

determine whether a second similarity score of the first set of similarity scores meets the first threshold, wherein the second similarity score is associated with a second stored query of the plurality of stored queries; and in accordance with a determination that the first similarity score and the second similarity score meet the first threshold:

obtain a set of case information for the current case;

retrieve, from the data store, at least one set of case information for at least one precedent case associated with the first stored query;

retrieve, from the data store, at least one set of case information for at least one precedent case associated with the second stored query;

generate a response to the query based on a combination of the at least one set of case information for at least one precedent case associated with the first stored query and the at least one set of case information for at least one precedent case associated with the second store query;

determine whether each of the first set of similarity scores is below the first threshold; and in accordance with a second determination that each of the first set of similarity scores is below the first threshold:

identify one or more sub-queries associated with the query;

determine whether a third similarity score of a second set of similarity scores between at least one of the one or more sub-queries and at least one of the plurality of stored queries meets the first threshold; and in accordance with a third determination that the third similarity score meets the first threshold:

generate the response to the query based on a precedent case associated with one of the plurality of stored queries corresponding to the third similarity score.

2. The system of claim 1, wherein the response is generated based on an output from an artificial intelligence model that is trained on the at least one set of case information for the at least one precedent case.

3. The system of claim 1, wherein the processors are further operable when executing the instructions to:

determine whether each of the third set of similarity scores is below the first threshold; and in accordance with a fourth determination that each of the third set of similarity scores is below the first threshold:

provide a prompt to the user;

receive an input from the user responsive to the prompt, wherein the input comprises a revision to the query or to one of the one or more sub-queries; and generate the response to the query based on the input from the user.

4. The system of claim 1, wherein the processors are further operable when executing the instructions to:

determine whether each of the third set of similarity scores is below the first threshold; and in accordance with a fourth determination that each of the third set of similarity scores is below the first threshold:

identify a set of further sub-queries, wherein each of the further sub-queries of the set of further sub-queries is associated with one of the one or more sub-queries; and generate the response to the query based on whether a fourth set of similarity scores between the set of further sub-queries and the plurality of stored queries meets the first threshold.

5. The system of claim 1, wherein the processors are further operable when executing the instructions to:

determine whether each of the third set of similarity scores is below the first threshold; and in accordance with a fourth determination that each of the third set of similarity scores is below the first threshold:

instantiate a communication link between a first device of the user and a second device of a subject matter expert, wherein the subject matter expert generates the response to the query.

6. The system of claim 5, wherein the processors are further operable when executing the instructions to forward engagement information associated with the user to the subject matter expert.

7. The system of claim 1, wherein obtaining the set of case information for the current case comprises:

providing, to the user, one or more supplemental queries associated with the stored query; and receiving, from the user in response to the one or more supplemental queries, the set of case information for the current case.

8. The system of claim 1, wherein obtaining the set of case information for the current case comprises automatically retrieving data on the user or the current case from the data store.

9. The system of claim 1, wherein the response comprises a confidence score on an accuracy of the response with respect to the query.

10. The system of claim 9, wherein the processors are further operable when executing the instructions to:

determine whether the confidence score is below a predetermined confidence threshold, wherein, in accordance with determining that the confidence score is below the predetermined confidence threshold, the response includes a recommendation for the user to consult with a subject matter expert.

11. The system of claim 1, wherein the response comprises a rationale for the response.

12. The system of claim 1, wherein the processors are further operable when executing the instructions to:

receive feedback from the user about the response to the query; and update, based on the feedback, a first algorithm for determining the first set of similarity scores.

13. The system of claim 1, wherein the processors are further operable when executing the instructions to:

prior to generating the response to the user, receive, from the user, a preliminary response to the query, and wherein the generated response comprises an agreement or disagreement on an accuracy of the preliminary response and a rationale for the agreement or disagreement.

14. The system of claim 1, wherein the response comprises a reference to the one of the at least one precedent case.

15. The system of claim 1, wherein the combination of the at least one set of case information for at least one precedent case associated with the first stored query and the at least one set of case information for at least one precedent case associated with the second store query comprises a weighted average.

16. The system of claim 15, wherein:

a first weight for the weighted average is assigned to the at least one set of case information for at least one precedent case associated with the first stored query based on a similarity between the at least one set of case information for at least one precedent case associated with the first stored query and the set of case information for the current case; and a second weight for the weighted average is assigned to the at least one set of case information for at least one precedent case associated with the second stored query based on a similarity between the at least one set of case information for at least one precedent case associated with the second stored query and the set of case information for the current case.

17. The system of claim 1, wherein generating the response comprises populating a template response based on the combination of the at least one set of case information for at least one precedent case associated with the first stored query and the at least one set of case information for at least one precedent case associated with the second store query.

18. A method for automatically generating responses to user queries, wherein the method is performed by a system comprising one or more processors, the method comprising:

receiving a query from a user, wherein the query is associated with a current case;

determining a first set of similarity scores between the query and a plurality of stored queries stored in a data store, wherein each of the plurality of stored queries is associated with one or more precedent cases;

determining whether a first similarity score of the first set of similarity scores meets a first threshold, wherein the first similarity score is associated with a first stored query of the plurality of stored queries;

determining whether a second similarity score of the first set of similarity scores meets the first threshold, wherein the second similarity score is associated with a second stored query of the plurality of stored queries; and in accordance with a determination that the first similarity score and the second similarity score meet the first threshold:

obtaining a set of case information for the current case;

retrieving, from the data store, at least one set of case information for at least one precedent case associated with the first stored query;

retrieving, from the data store, at least one set of case information for at least one precedent case associated with the second stored query;

generating a response to the query based on a combination of the at least one set of case information for at least one precedent case associated with the first stored query and the at least one set of case information for at least one precedent case associated with the second store query;

receiving a second query from a user, wherein the second query is associated with a second current case;

determining a third set of similarity scores between the second query and a second plurality of stored queries stored in a data store, wherein each of the second plurality of stored queries is associated with a second one or more precedent cases;

determining whether each of the third set of similarity scores is below the first threshold; and in accordance with a second determination that each of the third set of similarity scores is below the first threshold:

identifying one or more sub-queries associated with the second query;

determining whether a fourth similarity score of a second set of similarity scores between at least one of the one or more sub-queries and at least one of the second plurality of stored queries meets the first threshold; and in accordance with a third determination that the fourth similarity score meets the first threshold:

generating a response to the second query based on a precedent case associated with one of the second plurality of stored queries corresponding to the fourth similarity score.

19. A non-transitory computer-readable storage medium storing instructions for automatically generating responses to user queries, the instructions operable when executed by one or more processors of a system to cause the system to:

receive a query from a user, wherein the query is associated with a current case;

determine a first set of similarity scores between the query and a plurality of stored queries stored in a data store, wherein each of the plurality of stored queries is associated with one or more precedent cases;

determine whether a first similarity score of the first set of similarity scores meets a first threshold, wherein the first similarity score is associated with a first stored query of the plurality of stored queries;

determine whether a second similarity score of the first set of similarity scores meets the first threshold, wherein the second similarity score is associated with a second stored query of the plurality of stored queries; and in accordance with a determination that the first similarity score and the second similarity score meet the first threshold:

obtain a set of case information for the current case;

retrieve, from the data store, at least one set of case information for at least one precedent case associated with the first stored query;

retrieve, from the data store, at least one set of case information for at least one precedent case associated with the second stored query;

generate a response to the query based on a combination of the at least one set of case information for at least one precedent case associated with the first stored query and the at least one set of case information for at least one precedent case associated with the second store query;

determine whether each of the first set of similarity scores is below the first threshold; and in accordance with a second determination that each of the first set of similarity scores is below the first threshold:

identify one or more sub-queries associated with the query;

determine whether a third similarity score of a second set of similarity scores between at least one of the one or more sub-queries and at least one of the plurality of stored queries meets the first threshold; and in accordance with a third determination that the third similarity score meets the first threshold:

generate the response to the query based on a precedent case associated with one of the plurality of stored queries corresponding to the third similarity score.

* * * * *